United States Patent
Lee et al.

(10) Patent No.: US 12,387,015 B2
(45) Date of Patent: Aug. 12, 2025

(54) STORAGE DEVICE FOR A BLOCKCHAIN NETWORK BASED ON PROOF OF SPACE AND SYSTEM INCLUDING THE SAME

(71) Applicant: SAMSUNG ELECTRONICS CO., LTD., Suwon-si (KR)

(72) Inventors: Wijik Lee, Suwon-si (KR); Dongouk Moon, Seongnam-si (KR); Seunghan Lee, Suwon-si (KR); Jinwook Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 354 days.

(21) Appl. No.: 17/664,889

(22) Filed: May 25, 2022

(65) Prior Publication Data
US 2023/0139330 A1   May 4, 2023

(30) Foreign Application Priority Data
Oct. 28, 2021   (KR) .......................... 10-2021-0145171

(51) Int. Cl.
*G06F 21/79*   (2013.01)
*G06F 21/60*   (2013.01)
(Continued)

(52) U.S. Cl.
CPC ............ *G06F 21/79* (2013.01); *G06F 21/602* (2013.01); *G06F 21/76* (2013.01); *H04L 9/50* (2022.05)

(58) Field of Classification Search
CPC ........ G06F 21/79; G06F 21/602; G06F 21/76; G06F 21/6218; G06F 21/64;
(Continued)

(56) References Cited

U.S. PATENT DOCUMENTS 8,799,681 B1   8/2014   Linnell et al.
10,880,071 B2  12/2020   Pandurangan et al.
(Continued)

FOREIGN PATENT DOCUMENTS

JP   6901373   6/2021

OTHER PUBLICATIONS

L. Ismail, H. Materwala, A Review of Blockchain architecture and Consensus Protocols: Use Cases, Challenges, and Solutions, Symmetry, v.11, 1-47 (Year: 2019).*

*Primary Examiner* — Lynn D Feild
*Assistant Examiner* — Vladimir I Gavrilenko
(74) *Attorney, Agent, or Firm* — MORGAN, LEWIS & BOCKIUS LLP

(57) ABSTRACT

Storage devices and systems implementing blockchain networks based on proof of space (PoS) are described. A PoS module may be configured to perform PoS processing of PoS data transferred through an interface circuit to generate operation data. A security module may be configured to perform encryption of user data (to generate first encrypted data) and encryption of the operation data (to generate second encrypted data) using different encryption algorithms. A nonvolatile memory device may then store the first encrypted data and the second encrypted data in different namespaces (e.g., user data may be stored in a user namespace and PoS data may be stored in a PoS namespace). Accordingly, interference and/or malicious effect between the user data and the PoS data may be reduced (e.g., blocked) and stability of the PoS algorithm may be enhanced.

16 Claims, 21 Drawing Sheets

(51) Int. Cl.
  *G06F 21/76* (2013.01)
  *H04L 9/00* (2022.01)
(58) Field of Classification Search
  CPC ...... G06F 3/0644; G06F 3/0679; G06F 21/72;
    H04L 9/50; H04L 9/0897; H04L 9/14;
    H04L 9/3234; H04L 63/045; H04L 63/12
  See application file for complete search history.

(56) References Cited

U.S. PATENT DOCUMENTS

| | | |
|---|---|---|
| 11,032,259 B1 | 6/2021 | Bernat et al. |
| 11,418,402 B1 * | 8/2022 | Jakobsson ............. H04L 41/044 |
| 11,961,142 B2 * | 4/2024 | Leshner ............. G06Q 20/3829 |
| 2019/0268153 A1 * | 8/2019 | Kurian ................. H04L 9/3247 |
| 2019/0340136 A1 | 11/2019 | Irwin et al. |
| 2020/0118095 A1 * | 4/2020 | Fan .................... G06Q 20/3674 |
| 2020/0293206 A1 | 9/2020 | Isozaki et al. |
| 2020/0304289 A1 | 9/2020 | Androulaki et al. |
| 2021/0119776 A1 | 4/2021 | Kleeberger et al. |
| 2021/0157903 A1 | 5/2021 | Bursell et al. |
| 2021/0240611 A1 | 8/2021 | Tumanova et al. |

* cited by examiner

FIG. 15

| BYTES | DESCRIPTION |
|---|---|
| 63:60 | CDW15 |
| 59:56 | CDW14 |
| 55:52 | CDW13 |
| 51:48 | CDW12 |
| 47:44 | CDW11 |
| 43:40 | CDW10 |
| 39:24 | PRP ENTRY |
| 23:16 | MPTR |
| 15:08 | RESERVED |
| 07:04 | NSID |
| 03:00 | CDW0 |

FIG. 16

| BYTE | B7 | B6 | B5 | B4 | B3 | B2 | B1 | B0 |
|---|---|---|---|---|---|---|---|---|
| 3 | RESERVED | | | | | | | |
| 2 | RESERVED | | | | | | | |
| 1 | STID | | | | | | | |
| 0 | INCMP | SEQR | ACCLAT | | | ACCFRQ | | |

FIG. 21
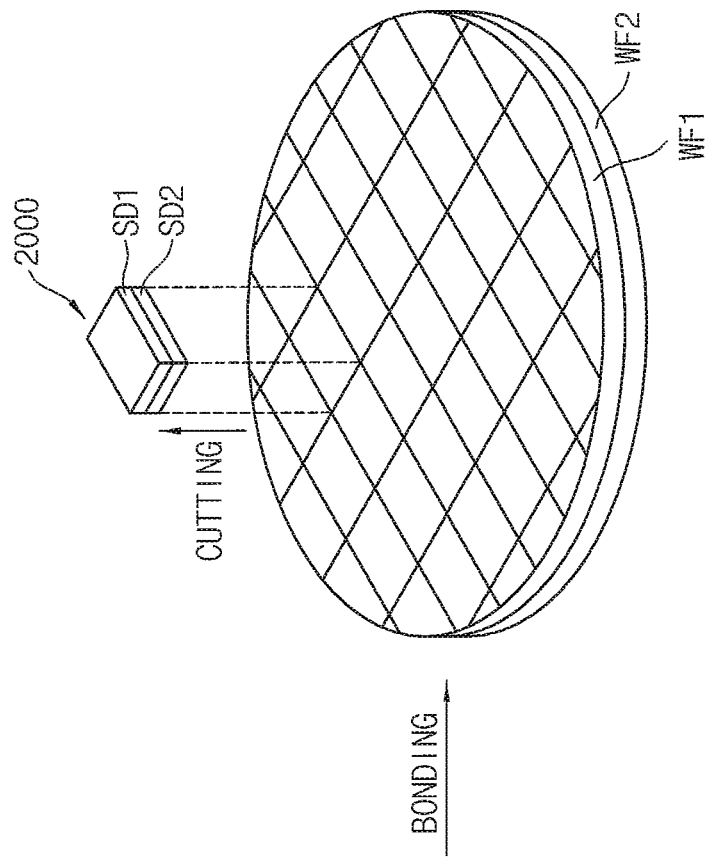
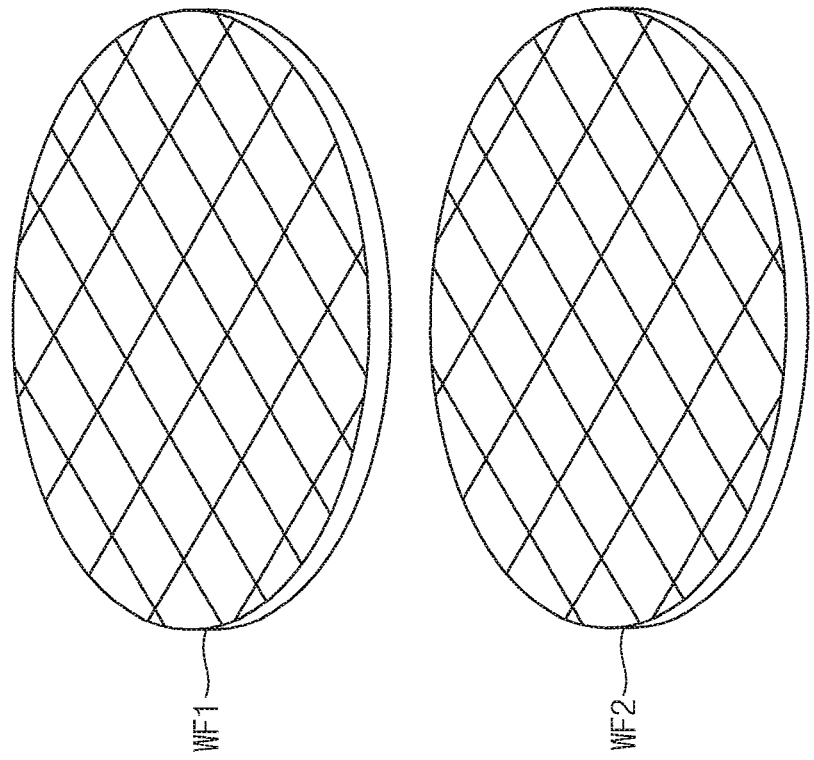

STORAGE DEVICE FOR A BLOCKCHAIN NETWORK BASED ON PROOF OF SPACE AND SYSTEM INCLUDING THE SAME

CROSS-REFERENCE TO RELATED APPLICATION

This U.S. non-provisional application claims priority under 35 USC § 119 to Korean Patent Application No. 10-2021-0145171, filed on Oct. 28, 2021, in the Korean Intellectual Property Office (KIPO), the disclosure of which is incorporated by reference herein in its entirety.

BACKGROUND

1. Technical Field

Example embodiments relate generally to semiconductor integrated circuits, and more particularly to storage devices of a blockchain network based on proof of space (PoS) and systems including such storage devices.

2. Discussion of the Related Art

Blockchain technology is an emerging technology that enables decentralization of data and information based on various consensus algorithms Numerous applications are being proposed that may benefit from blockchain technology's immunity against modification and manipulation. However, consensus methods used in a blockchain platform may be associated with high operation costs to guarantee the system's integrity. Examples of representative consensus algorithms include proof of work, proof of stake, etc. Proof of work techniques may have implementation challenges due to high costs, for example, because a large amount of electric energy may be consumed for mining. Further, proof of stake techniques may implementation challenges due to relatively low stability. In some cases, proof of space (PoS) techniques have been proposed to solve such challenges of proof of work and proof of stake consensus algorithms, however there is a need in the art for improved systems and techniques in order to enhance the efficiency and stability of PoS consensus algorithms.

SUMMARY

Some example embodiments may provide a storage device and a system capable of performing a proof of space (PoS) algorithm efficiently and stably.

According to example embodiments, a storage device includes an interface circuit, a PoS module, a security module and a nonvolatile memory device. The interface circuit performs communication with an external device. The PoS module performs PoS processing of PoS data transferred through the interface circuit to generate operation data. The security module performs a first encryption of user data transferred through the interface circuit to generate first encrypted data and performs a second encryption of the operation data provided from the PoS module to generate second encrypted data. The nonvolatile memory device stores the first encrypted data and the second encrypted data. The nonvolatile memory device comprises a memory cell array in which a plurality of nonvolatile memory cells are arranged.

According to example embodiments, a storage device includes an interface circuit connected directly to a communication network forming a blockchain network, wherein the interface circuit is configured to perform communication with an external device that is connected to the communication network, a PoS module configured to perform PoS processing of PoS data transferred through the interface circuit to generate operation data, a user security module configured to perform a first encryption of user data transferred through the interface circuit to generate first encrypted data, a PoS security module configured to perform a second encryption of the operation data provided from the PoS module to generate second encrypted data, and a nonvolatile memory device configured to store the first encrypted data in a user namespace and store the second encrypted data in a PoS namespace, wherein the nonvolatile memory device comprises a memory cell array in which a plurality of nonvolatile memory cells are arranged.

According to example embodiments, a system includes a storage device and a host device configured to control the storage device. The storage device includes an interface circuit configured to perform communication with the host device, a PoS module configured to perform PoS processing of PoS data transferred through the interface circuit to generate operation data, a security module configured to perform a first encryption of user data transferred through the interface circuit to generate first encrypted data and perform a second encryption of the operation data provided from the PoS module to generate second encrypted data, and a nonvolatile memory device configured to store the first encrypted data and the second encrypted data, wherein the nonvolatile memory device comprises a memory cell array in which a plurality of nonvolatile memory cells are arranged.

Storage devices and systems according to example embodiments may block interference and/or malicious effect between user data and PoS data, as well as enhance stability of the PoS algorithm (e.g., by applying different algorithms to the user data and the PoS data, by storing the user data and the PoS data in different namespaces, etc.).

In addition, the techniques and systems described herein may enhance efficiency of the PoS algorithm, for example, by adaptively setting the size of the storage space corresponding to the user data and the size of the storage space corresponding to the PoS data.

BRIEF DESCRIPTION OF THE DRAWINGS

Example embodiments of the present disclosure will be more clearly understood from the following detailed description taken in conjunction with the accompanying drawings.

FIG. 15 is a diagram illustrating one or more aspects of an example format of a command that is transferred from a host device to a storage device according to one or more aspects of the present disclosure.

FIG. 16 is a diagram illustrating one or more aspects of an example format of a lowest double word included in the command of FIG. 15.

FIG. 21 is a conceptual diagram illustrating manufacture of a stacked semiconductor device according to example embodiments of the present disclosure.

DETAILED DESCRIPTION OF THE EMBODIMENTS

Figure 1:
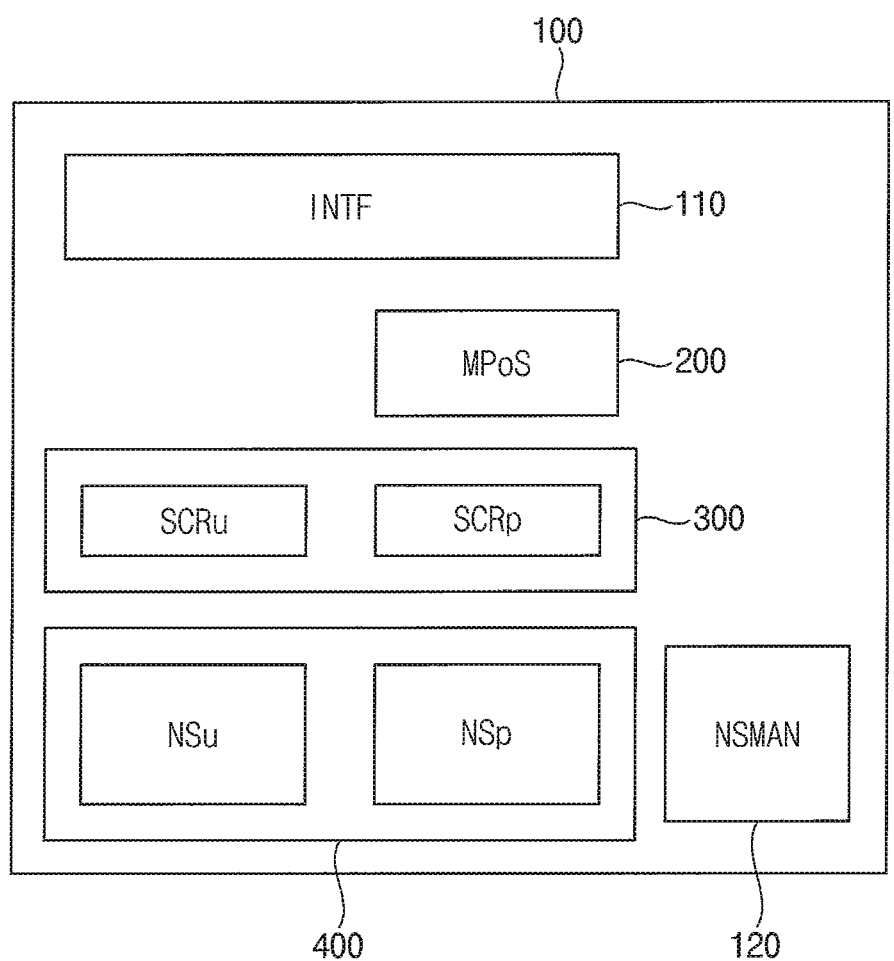
FIG. 1 is a block diagram illustrating one or more aspects of a storage device according to example embodiments of the present disclosure.

In some aspects, a blockchain may refer to a data management technique in which persistently increasing data are recorded in blocks of a specific unit, and where each node constituting a peer-to-peer P2P network may connect and manage the blocks like a chain or connect and manage data itself in which the blocks are connected like a chain. In some aspects, the data connected like a chain is operated in the form of a distributed ledger at each node without a central system.

In distributed computing (e.g., such as in some blockchain systems), consensus methods (e.g., consensus algorithms) may be implemented to achieve overall system reliability (e.g., in the presence of a number of faulty processes). Consensus methods may generally refer to methods or techniques for coordinating processes to reach consensus, or methods or techniques for system agreement on some data value that is needed during computation. Examples of representative consensus algorithms include proof of work, proof of stake, etc. Proof of work and proof of stake techniques may have implementation challenges due to high costs (e.g., due to large electric energy consumption for operations such as mining), relatively low stability, etc.

In some examples, proof of space (PoS) consensus methods may be implemented. PoS is a type of consensus method (e.g., consensus algorithm) achieved by demonstrating one's authentic interest in a service (e.g., transmitting email) by allocating disk space or memory to work out a challenge presented by a service provider. In some aspects, PoS consensus methods may include a prover sending a piece of data (e.g., a PoS) to a verifier in order to verify that the prover has allocated (e.g., reserved) a certain amount of space (e.g., PoS may be similar, in some aspects, to proof of work, except storage may be used instead of computation to earn rewards).

As described in more detail herein, one or more aspects of the present disclosure may provide for improved storage devices and systems via implementation of blockchain networks based on PoS. In some aspects, a storage device itself may be a node of a blockchain network based on PoS, or a system including a storage device may be a node of the blockchain network based on PoS.

According to techniques described herein, storage devices may include PoS modules to perform PoS processing of PoS data, where different encryption algorithms may be applied to user data and PoS data. Moreover, techniques for storing user data and the PoS data on different namespaces are also described. Accordingly, interference and/or malicious effects between the user data and the PoS data may be reduced (e.g., blocked). Further, stability of the PoS algorithm may be enhanced by applying the different algorithms (e.g., different encryption algorithms) to the user data and the PoS data, and by storing the user data and the PoS data in different namespaces.

Various example embodiments are described in more detail herein (e.g., with reference to the accompanying drawings, in which some example embodiments are shown). In some aspects, in the drawings, like numerals may refer to like elements (e.g., and repeated descriptions may be omitted).

FIG. 1 is a block diagram illustrating a storage device according to example embodiments.

Referring to FIG. 1, a storage device 100 may include an interface circuit INTF 110, a PoS module MPoS 200, a security module 300, a nonvolatile memory device 400 and a namespace management module NSMAN 120.

The interface circuit 110 may perform communication with an external device (e.g., the interface circuit 110 may communicate with an external device, receive commands from an external device, receive data from an external device, transmit data to an external device, etc.). According to example embodiments, the external device may be a host device that is directly connected to the storage device 100, the external device may be another storage device or a system including the storage device that is connected to the storage device 100 through a communication network, etc.

Figure 7:
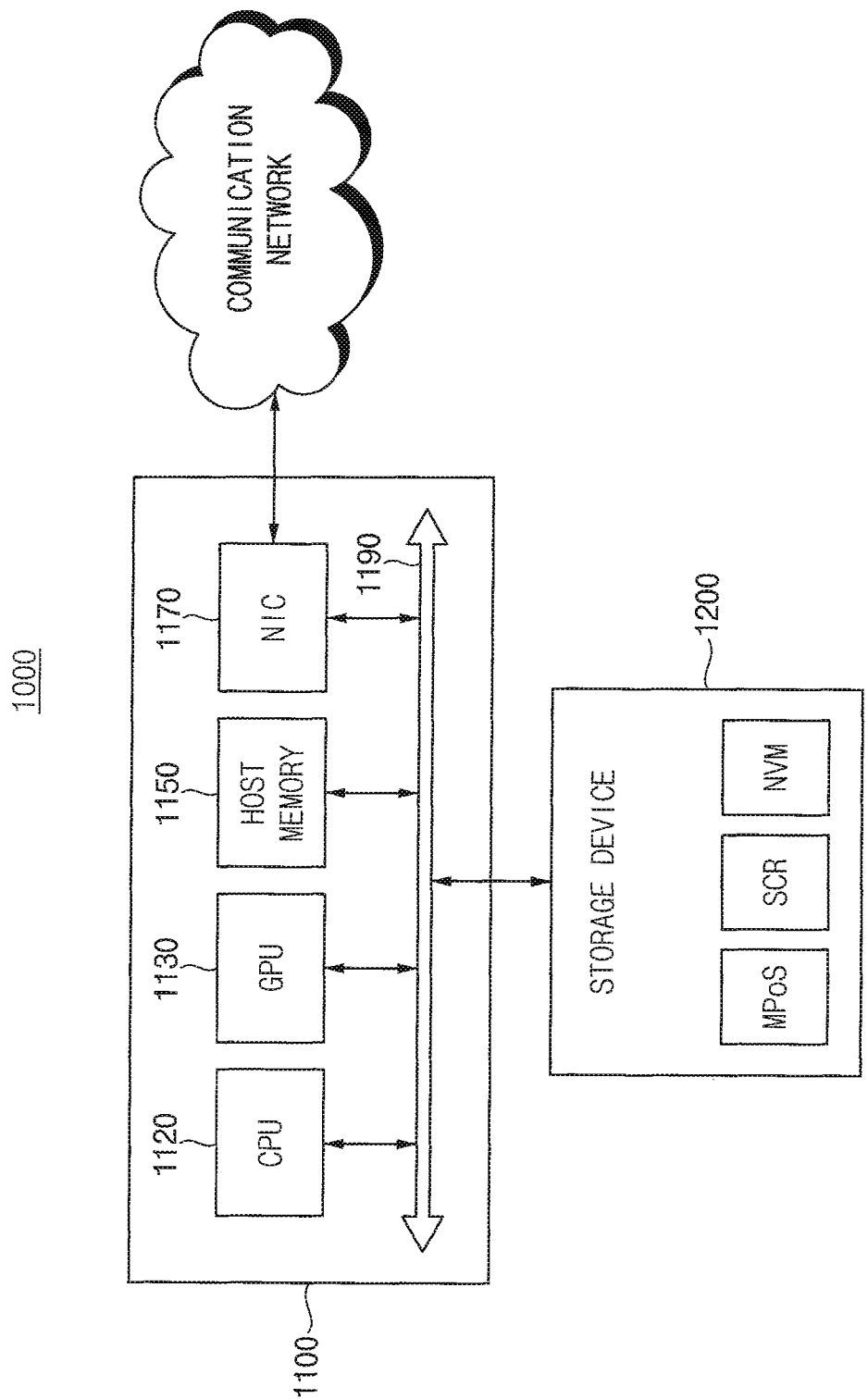
FIG. 7 is a block diagram illustrating one or more aspects of a system including a storage device according to example embodiments of the present disclosure.

In some example embodiments (e.g., as described in more detail herein, for example, with reference to FIG. 7), the interface circuit 110 may include a host interface for connection with the host device, and the storage device 100 be directly connected to the host device though the host interface. In such examples, the host device may include a network card to be connected to the communication network forming a blockchain network.

Figure 8:
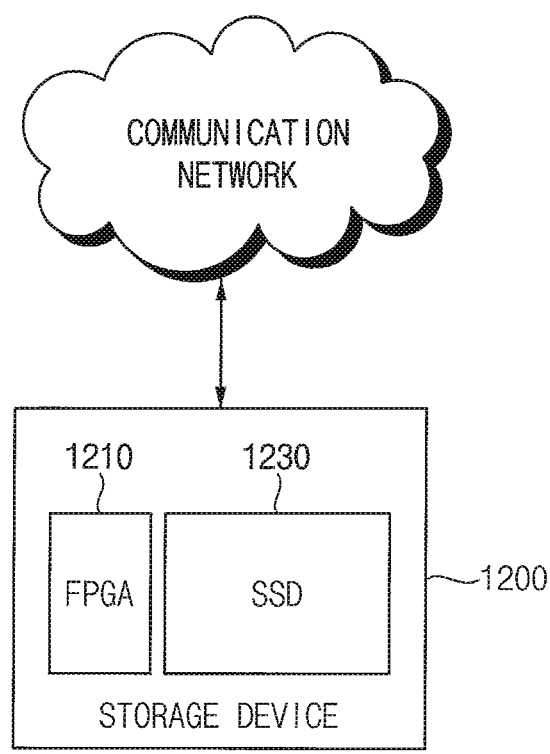
FIG. 8 is a block diagram illustrating one or more aspects of a storage device according to example embodiments of the present disclosure.

In some examples, the interface circuit 110 includes a network interface card, and the storage device 110 is connected directly to a communication network forming a blockchain network (e.g., through the network interface card, as described in more detail herein, for example, with reference to FIG. 8).

The PoS module 200 may perform PoS processing of PoS data transferred through the interface circuit 110 to generate operation data (e.g., where the PoS data is related with PoS). The PoS module 200 may perform a PoS algorithm.

Encryption may generally refer to techniques for encoding information. Encryption techniques may convert an original representation of data (e.g., an original representation of information, which may be referred to as plaintext) into an alternative representation (e.g., which may be referred to as ciphertext). Decryption may refer to the reverse process, where the alternative representation may be decrypted in attempt to retrieve the original data or the original information. Ideally, only intended (e.g., authorized) parties can accurately decipher the alternative representation back to the original representation and access the original information.

The security module 300 may perform a first encryption of user data transferred through the interface circuit 110 to generate first encrypted data and perform a second encryption of the operation data provided from the PoS module 200 to generate second encrypted data. In some examples, the user data and the operation data (e.g., the processed PoS data) is encrypted using different encryption algorithms. For instance, the security module 300 may perform the first encryption and the second encryption using different encryption algorithms Encryption algorithms may include advanced encryption standard (AES) algorithm, etc. using symmetric keys, and Rivest Sharmir Adleman (RAS) algorithm, identity-based encryption (IBE) algorithm, post-quantum cryptography (PQC) algorithm, etc. using asymmetric keys. The techniques described herein are not limited thereto. For example, other encryption algorithms may be used by analogy, without departing from the scope of the present disclosure.

In some example embodiments, the security module 300 may include a user security module (e.g., SCRu) for performing the first encryption of the user data and a PoS security module (e.g., SCRp) for performing the second encryption of the PoS data.

The nonvolatile memory device 400 may store the first encrypted data and the second encrypted data. As described in more detail herein, the nonvolatile memory device 400 may include a memory cell array in which a plurality of nonvolatile memory cells are arranged, and the memory cell array may include a plurality of memory blocks.

The namespace management module 120 may generate, set and manage namespaces on the nonvolatile memory device 400. A namespace indicates one logical partition and/or one storage space. In some embodiments, a high-capacity storage device may be partitioned into a plurality of namespaces included in a physically-identical storage device. Each namespace may be used as an individual storage space.

The namespace management module 120 may set a user namespace NSu based on (e.g., with respect to) the user data and a PoS namespace NSp based on (e.g., with respect to) the PoS data, respectively.

The storage device 100 may store the first encrypted data corresponding to the user data on the user namespace NSu and store and store the second encrypted data corresponding to the PoS data on the PoS namespace NSp.

As such, the storage device 100 and a system including the storage device 100 according to example embodiments may block interference and/or malicious effect between the user data and the PoS data and enhance stability of the PoS algorithm by applying different algorithms to the user data and the PoS data and storing the user data and the PoS data in different namespaces.

In addition, the storage device 100 and the system according to example embodiments may enhance efficiency of the PoS algorithm by adaptively setting the size of the storage space corresponding to the user data and the size of the storage space corresponding to the PoS data.

In some examples, PoS data may refer to data associated with a PoS consensus method (e.g., any data used by, computed by, or generated by a PoS algorithm). In some cases, PoS data may include or refer to data sent by a prover to a verifier (e.g., PoS data may include data sent to prove that a prover has reserved or allocated a certain amount of space). In some cases, a prover may include a storage device, an external device, a host device, etc. In some cases, a verifier may include a storage device, an external device, a host device, etc.

PoS algorithms may be used in various applications. In some cases, PoS algorithms may include PoS-based anti-spam applications, PoS-based denial of service attack prevention algorithms, PoS-based malware detection algorithms, etc. In some cases, PoS algorithms may be used in place of (e.g., as an alternative to) proofs of work in various other applications.

User data may generally refer to any other data employed by (e.g., used by, stored by, etc.) a storage device or a system including a storage device (e.g., such as read data, write data, encoded data, decoded data, metadata, etc.).

Figure 2:
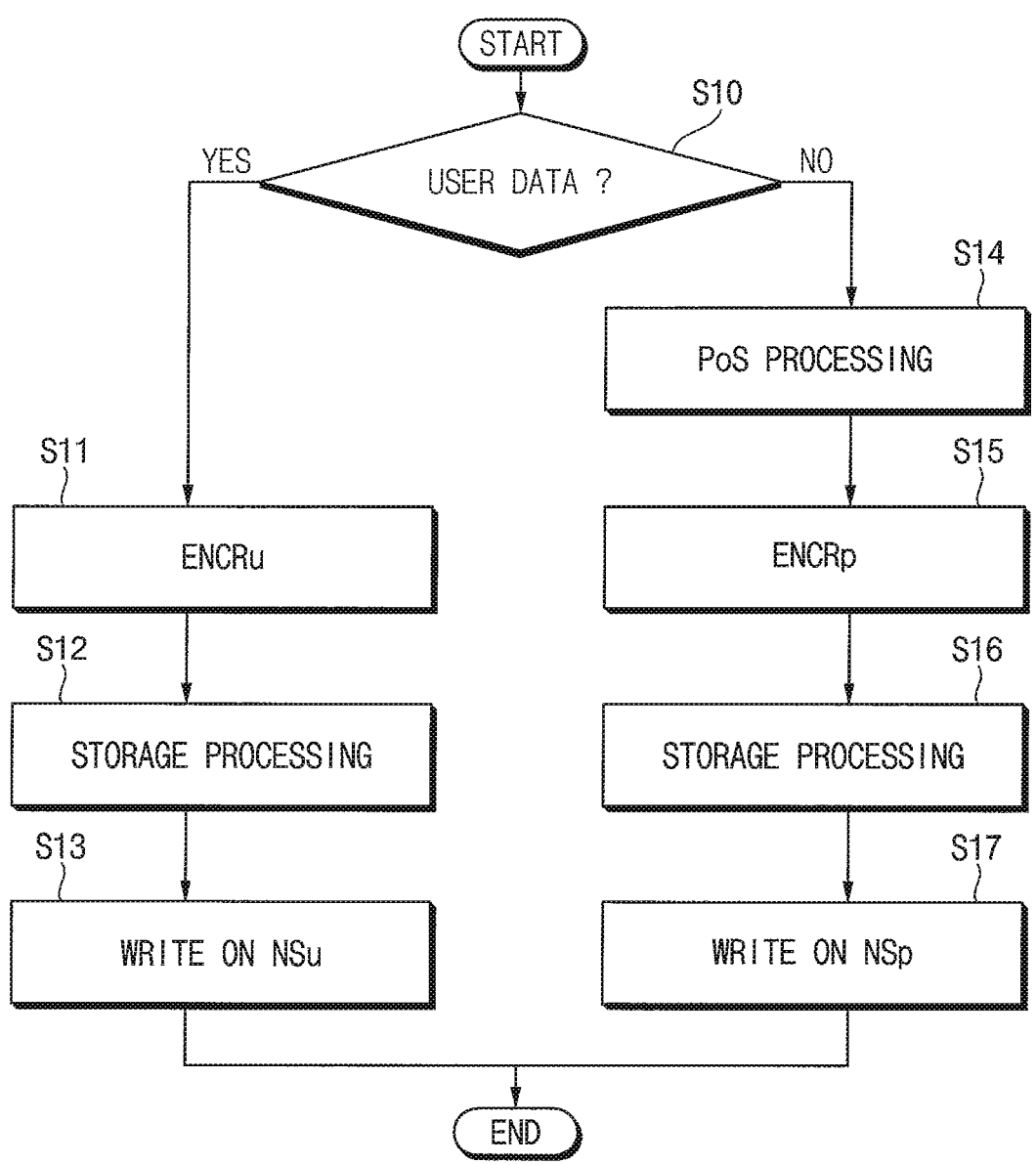
FIGS. 2 and 3 are flowcharts illustrating one or more aspects of operations of a storage device according to example embodiments of the present disclosure.
Figure 3:
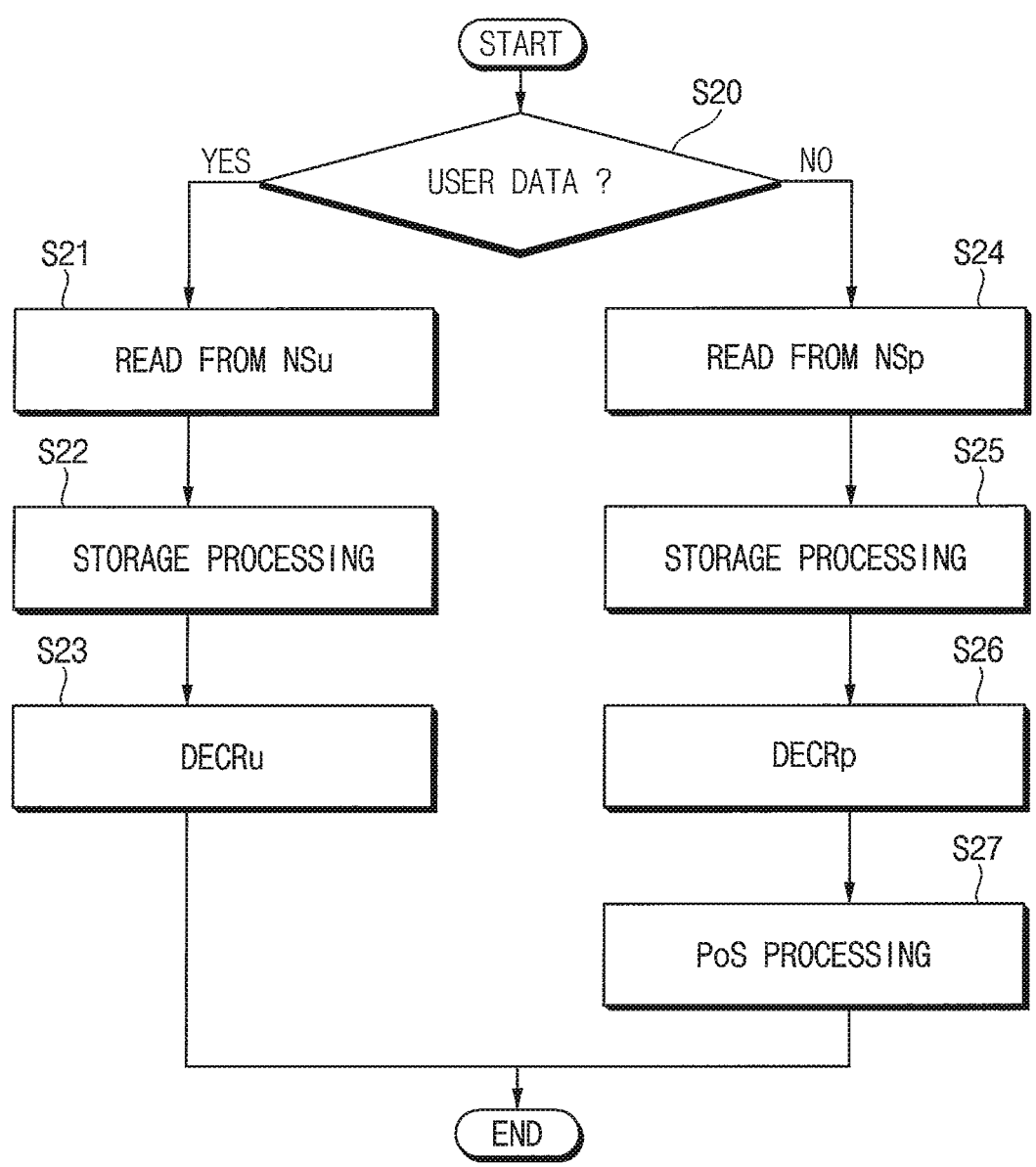

FIGS. 2 and 3 are flowcharts illustrating operations of a storage device according to example embodiments.

Referring to FIGS. 1 and 2, the storage device 100 may determine whether the data transfer through the interface circuit 110 is the user data or the PoS data (S10). In some example embodiments (e.g., as described in more detail herein, for example, with reference to FIG. 15), the storage device may differentiate the PoS data from the user data based on a namespace identifier NSID included in a command (e.g., a write command) received from a host device. For example, the interface circuit 110 may parse the received command and determine whether the namespace identifier NSID indicates the user data or the PoS data.

When the namespace identifier NSID corresponds to the user namespace NSu, that is when the data transferred from the external device is the user data (S10: YES), the interface circuit 110 may transfer the data from the external device to the security module 300 as the user data. In contrast, when the namespace identifier NSID corresponds to the PoS namespace NSp, that is when the data transferred from the external device is the PoS data (S10: NO), the interface circuit 110 may transfer the data from the external device to the PoS module 200 as the PoS data.

When the transferred data is the user data (S10: YES), the user security module SCRu in the security module 300 may perform the first encryption ENCu of the user data to generate the first encrypted data (S11). The storage device 100 may perform storage processing such as error correction code (ECC) encoding, randomizing, etc. to generate first processed data (S12) and store or write the first processed data on the user namespace NSu of the nonvolatile memory device 400 (S13).

When the transferred data is the PoS data (S10: NO), the security module 300 may perform the PoS processing of the PoS data to generate the operation data (S14). The PoS security module SCRp in the security module 300 may perform the second encryption ENCp of the operation data to generate the second encrypted data (S15). The storage device 100 may perform storage processing such as ECC encoding, randomizing, etc. to generate second processed data (S16) and store or write the second processed data on the PoS namespace NSp of the nonvolatile memory device 400 (S17).

In some examples, storage device 100 may include memory controllers (e.g., that may be connected to several NAND channels in parallel to achieve high data throughput). The memory controller includes signal processing and Error Correction Code (ECC) engines that decode the data from the NAND and retrieve the stored data reliably.

In some example embodiments, the storage processing may be omitted. In such examples, the first encrypted data and the second encrypted data are stored on the user namespace NSu and the PoS namespace NSp, respectively.

Referring to FIGS. 1 and 3, the storage device 100 may determine whether the data to be read from the nonvolatile memory device 400 is the user data or the PoS data (S10). In some example embodiments (e.g., as described in more detail herein, for example, with reference to FIG. 15), the storage device may differentiate the PoS data from the user data based on the namespace identifier NSID included in a command (e.g., a read command) received from the host device. For example, the interface circuit 110 may parse the received command and determine whether the namespace identifier NSID indicates the user data or the PoS data.

When the namespace identifier NSID corresponds to the user namespace NSu, for example, when the data to be read from the nonvolatile memory device 400 is the user data (S20: YES), the storage device 100 may read the first processed data from the user namespace NSu of the nonvolatile memory device 400 (S21). The storage device 100 may perform storage processing such as ECC decoding, derandomizing, etc. to provide the first encrypted data to the security module 300 (S22). The user security module SCRu in the security module 300 may perform the first decryption DECRu of the first encrypted data to generate first decrypted data corresponding to the user data (S23). The first decrypted data or the user data may be transferred to the external device through interface circuit 110.

When the namespace identifier NSID corresponds to the PoS namespace NSp, for example, when the data to be read from the nonvolatile memory device 400 is the PoS data (S20: NO), the storage device 100 may read the second processed data from the PoS namespace NSp of the nonvolatile memory device 400 (S24). The storage device 100 may perform storage processing such as ECC decoding, derandomizing, etc. to provide the second encrypted data to the security module 300 (S25). The PoS security module SCRp in the security module 300 may perform the second decryption DECRp of the second encrypted data to generate second decrypted data corresponding to the operation data (S26). The PoS module 200 may perform verification of the second decrypted data according to the PoS consensus algorithm to generate verification result data (S27). The verification result data may be transferred to the external device through interface circuit 110.

Figure 4:
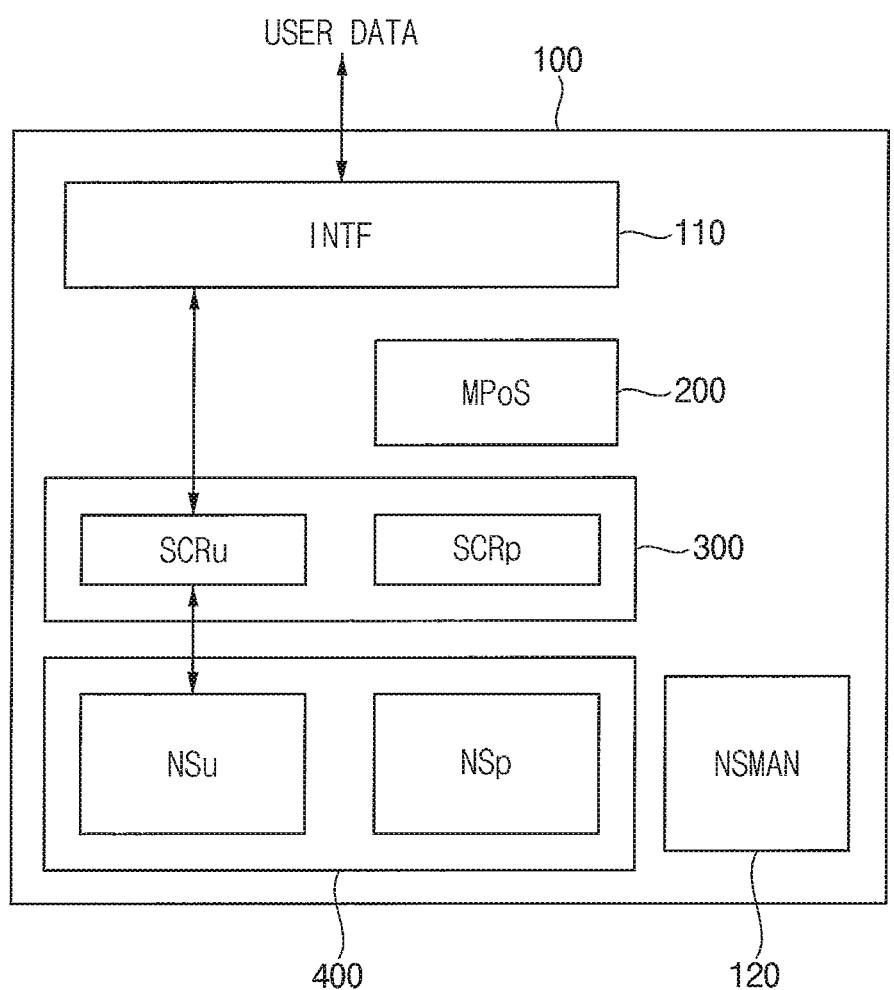
FIGS. 4 and 5 are diagrams illustrating one or more aspects of a data flow of a storage device according to example embodiments of the present disclosure.
Figure 5:
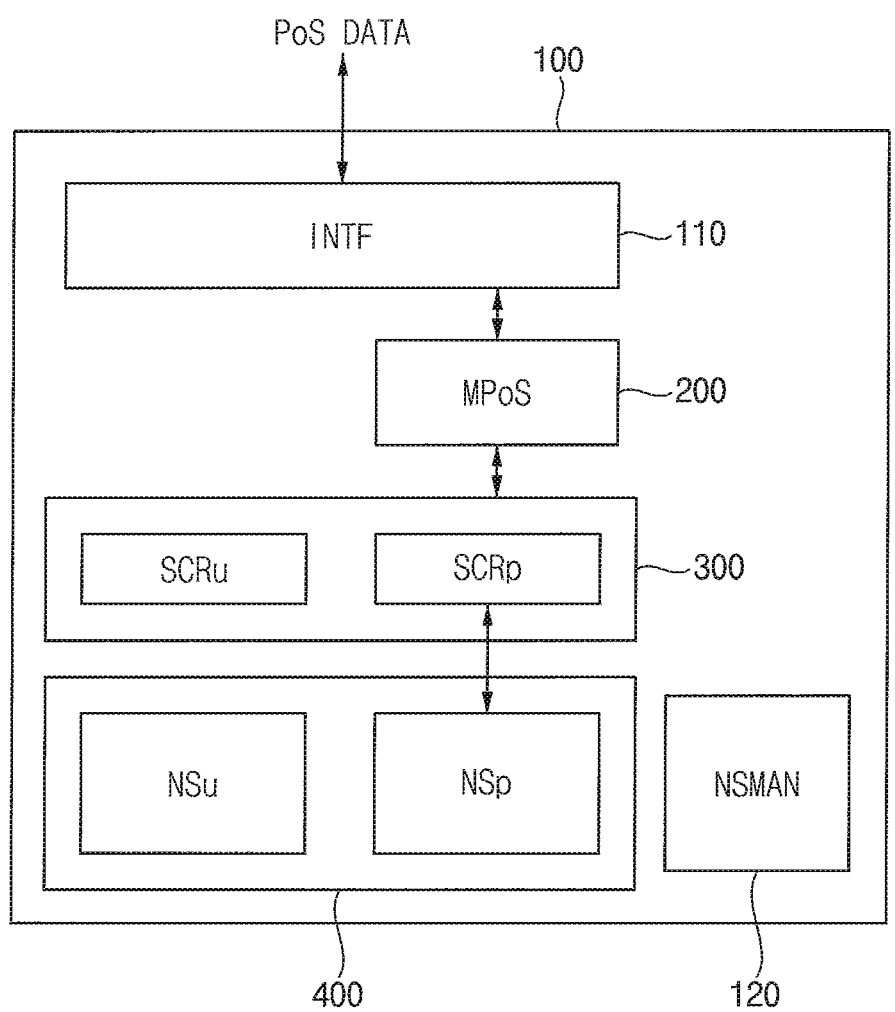

FIGS. 4 and 5 are diagrams illustrating data flow of a storage device according to example embodiments. The descriptions repeated with FIGS. 1 through 3 may be omitted. FIG. 4 illustrates a data flow related with the user data. In the write operation of the user data received from the external device, the user data may be stored on the user namespace NSu of the nonvolatile memory device 400 via the interface circuit 110, the user security module SCRu in the security module 300. In the read operation of the user data, the user data may be read from the user namespace NSu of the nonvolatile memory device 400 and provided to the external device via the user security module SCRu and the interface circuit 110.

FIG. 5 illustrates data flow related with the PoS data. In an initialization operation based on the PoS data, the PoS data received from the external device may be stored on the PoS namespace NSp of the nonvolatile memory device 400 via the interface circuit 110, the PoS module 200, the PoS security module SCRp in the security module 300. In a verification operation based on the PoS data, the PoS data may be read from the PoS namespace NSp of the nonvolatile memory device 400 and provided to PoS module 200 via the PoS security module SCRp. The verification result data generated by the PoS module 200 may be provided to the external device via the interface circuit 110.

Figure 6:
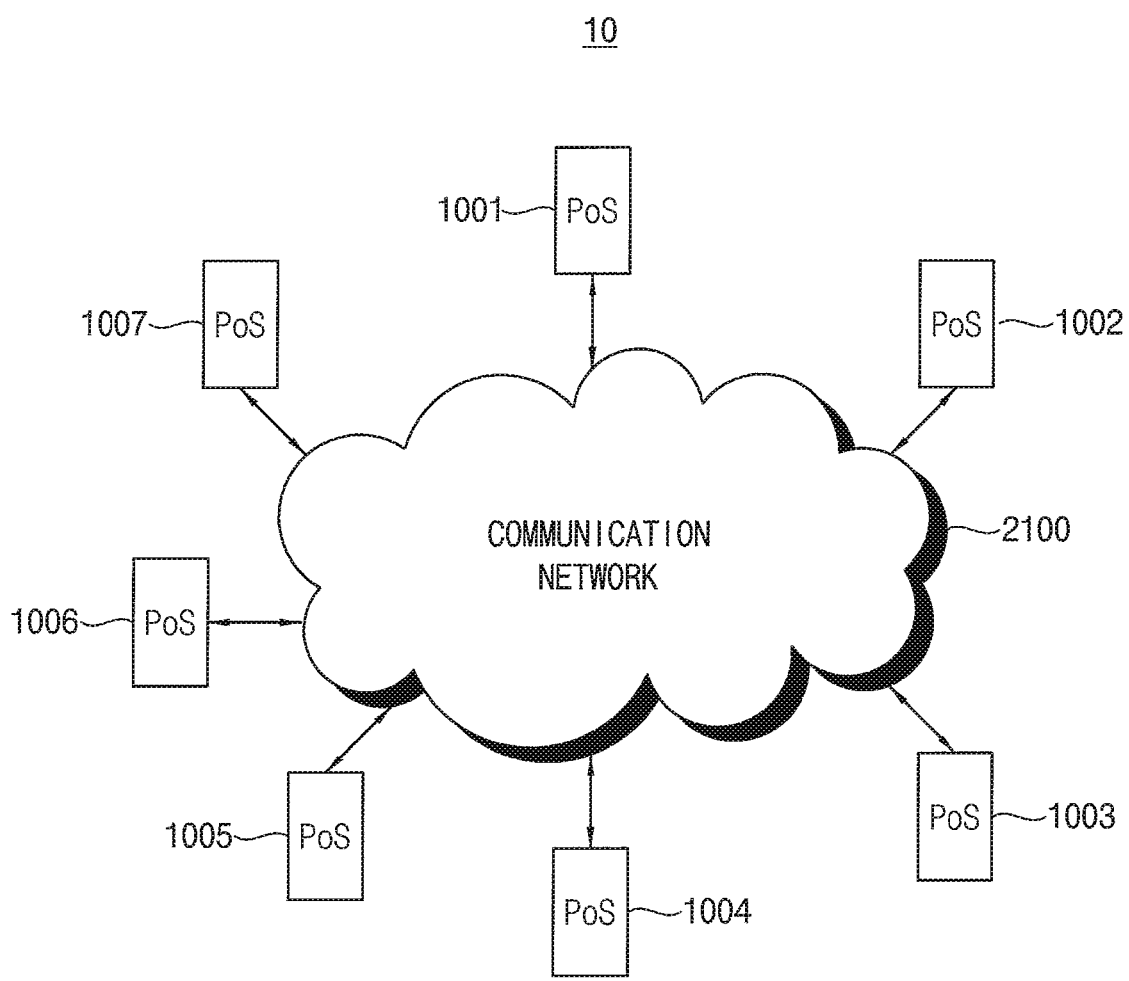
FIG. 6 is a diagram illustrating one or more aspects of a blockchain network using a storage device according to example embodiments of the present disclosure.

FIG. 6 is a diagram illustrating a blockchain network using a storage device according to example embodiments.

Referring to FIG. 6, a blockchain network 10 may include a communication network 2100 and a plurality of electronic systems 1001-1007 connected to the communication network 2100. The plurality of electronic systems 1001-1007 may form nodes of the blockchain network 10 and the number of the nodes may be determined variously.

At least a portion of the plurality of electronic systems 1001-1007 may be the storage device 100 based on PoS and/or a system including the storage device 100.

FIG. 7 is a block diagram illustrating a system including a storage device according to example embodiments.

A system 1000 of FIG. 7 may be one of a desktop computer, a laptop computer, a tablet computer, a smartphone, a wearable device, a server, an electric vehicle, home applications, etc.

Referring to FIG. 7, the system 1000 may be roughly divided into a host device 1100 and a storage device 1200.

The host device 1100 may perform various arithmetic/logical operations for the purpose of controlling overall operations of the system 1000. The host device 1100 may include a central processing unit (CPU) 1120, a graphic processing unit (GPU) 1130, a host memory 1150, a network interface card (NIC) 1170, and a system bus 1190. Alternatively, the host device 1100 may be a device which includes one or more processor cores, such as for example a general-purpose CPU, a dedicated application specific integrated circuit (ASIC), or an application processor.

The central processing unit 1110 executes a variety of software (e.g., an application program, an operating system, and a device driver) loaded onto the host memory 1150. The central processing unit 1110 may execute an operating system (OS) and application programs. The central processing unit 1110 may be implemented for example with a homogeneous multi-core processor or a heterogeneous multi-core processor. In particular, the central processing unit 1110 may request the storage device 1200 to process a data intensive work load operation such as data compression, data encryption, data processing, etc.

The graphics processing unit 1130 performs various graphic operations in response to a request of the central processing unit 1110. For example, the graphics processing unit 1130 may convert process-requested data to data suitable for display. A streaming access to the storage device 1200 may also be requested by the graphics processing unit 1130. The graphics processing unit 1130 has an operation structure that is suitable for parallel processing in which similar operations are repeatedly processed. Accordingly, graphics processing units such as graphics processing unit 1130 are currently being developed to have a structure that may be used to perform various operations demanding high-speed parallel processing as well as graphic operations. For example, the graphics processing unit 1130 that processes a general-purpose operation as well as a graphic processing operation is called a general purpose computing on graphics processing units (GPGPU). The GPGPU may for example be used to analyze a molecular structure, to decrypt a code, or to predict a meteorological change in addition to video decoding.

The host memory 1150 may store data that are used to operate the system 1000. For example, the host memory 1150 may store data processed or to be processed by the host device 1100. The host memory 1150 may include volatile/nonvolatile memory such as for example static random access memory (SRAM), dynamic RAM (DRAM), synchronous DRAM (SDRAM), phase-change RAM (PRAM), ferro-electric RAM (FRAM), magneto-resistive RAM (MRAM), and resistive RAM (ReRAM).

The network interface card 1170 is a communication interface for connecting an Ethernet switch (not illustrated) or an Ethernet fabric with the system 1000. For example, in the case where the Ethernet switch corresponds to a wired LAN network, the network interface card 1170 may be implemented with a wired LAN card. Of course, even in the case where the Ethernet switch is a wireless LAN, the network interface card 1170 may be implemented with hardware that processes a communication protocol corresponding to the wireless LAN.

The system bus 1190 provides a physical connection between the host device 1100 and the storage device 1200. For Example, the system bus 1190 may transfer a command, an address, data, etc. which correspond to various access requests generated from the host device 1100, so to be suitable for an interface manner with the storage device 1200. The system bus 1190 may be configured according to any of a variety of different communication protocols such as for example Universal Serial Bus (USB), Small Computer System Interface (SCSI), Peripheral Component Interface express (PCIe), Advanced Technology Attachment (ATA), parallel ATA (PATA), serial ATA (SATA), serial attached SCSI (SAS), and universal flash storage (UFS).

The storage device 1200 may store data regardless of whether power is supplied. For example, the storage device 1200 may include storage mediums such as for example solid state drives (SSDs), secure digital (SD) cards, embedded multimedia cards (eMMC), or the like. In some example embodiments, the storage device 1200 may include a field programmable gate array (FPGA) 1210 and an SSD 1230.

The storage device 1200 may include a proof of space (PoS) module MPoS, a security module SCR, a nonvolatile memory device NVM, etc. As described herein, the PoS module MPoS may the PoS processing of the PoS data transferred through the interface circuit to generate the operation data. The security module SCR may perform the first encryption of the user data transferred through the interface circuit to generate the first encrypted data and perform the second encryption of the operation data provided from the PoS module MPoS to generate the second encrypted data. The nonvolatile memory device NVM may store store the first encrypted data and the second encrypted data. As described herein, the first encrypted data may be stored on the user namespace NSu of the nonvolatile memory device NVM and the second encrypted data may be stored on the PoS namespace NSp of the nonvolatile memory device NVM, respectively.

In some example embodiments, the storage device 1200 may be a removable device that may be selectively connected to an electronic device including the host device 1100. For example, the host device 1100 may be mounted on a main board of the electronic system and the storage device 1200 may be attached to a socket of the electronic device such that the storage device 1200 may be electrically connected to the host device 1100.

In some example embodiments, the storage device 1200 may be an embedded device that is integrated together with the host device 1100 in the electronic device. In such examples, the storage device 1200 may be electrically connected to the host device 1100 through an internal system bus of the electronic device.

FIG. 8 is a block diagram illustrating a storage device according to example embodiments.

Referring to FIG. 8, in some example embodiments, the storage device may include a field programmable gate array (FPGA) 1210 and an solid state drive (SSD) 1230.

The FPGA 1210 may access the SSD 1230 in response to a request from the host device 1100. For example, the FPGA 1210 may transfer a streaming access command to the SSD 1230 in response to a data request from the host device 1100. The streaming access command may include information of a logical block address (LBA) list, a stream identifier (ID), a chunk size, a priority, etc. The storage device 1200 including the FPGA 1210 and the SSD 1230 may be referred to as a smart SSD or a computational SSD.

The FPGA 1210 may process within the storage device 1200 stream data provided from the SSD 1230 in response to the streaming access command Result data processed by the FPGA 1210 may be returned to the host device 1100. In some aspects, the operation of the FPGA 1210 may make it possible to markedly improve (e.g., or minimize) a decrease in a bandwidth due to the exchange of stream data between the storage device 1200 and the host device 1100.

The SSD 1230 stores or outputs data in response to a request provided from the host device 1100 or the FPGA 1210. The SSD 1230 may provide stream data in units of a requested data size in response to the streaming access command (e.g., a streaming read command or a streaming write command) For example, in the case where requested data are stored in a buffer (not illustrated), the SSD 1230 may allow a DMA engine (not illustrated) of the FPGA 1210 to sequentially read data stored in the buffer.

In some example embodiments, as illustrated in FIG. 7, the storage device 1200 may be, through the interface circuit (e.g., the interface circuit 1250 in FIG. 9), connected directly to the system 1000 including the host device 1100. In such examples, the host device 1100 may include a network interface card to be connected to the communication network forming the blockchain network.

In some example embodiments, as illustrated in FIG. 8, the interface circuit (e.g., the interface circuit 1250 in FIG. 9) may include a network interface card, and the storage device 1200 may be, through the network interface card, connected directly to the communication network forming the blockchain network.

Figure 9:
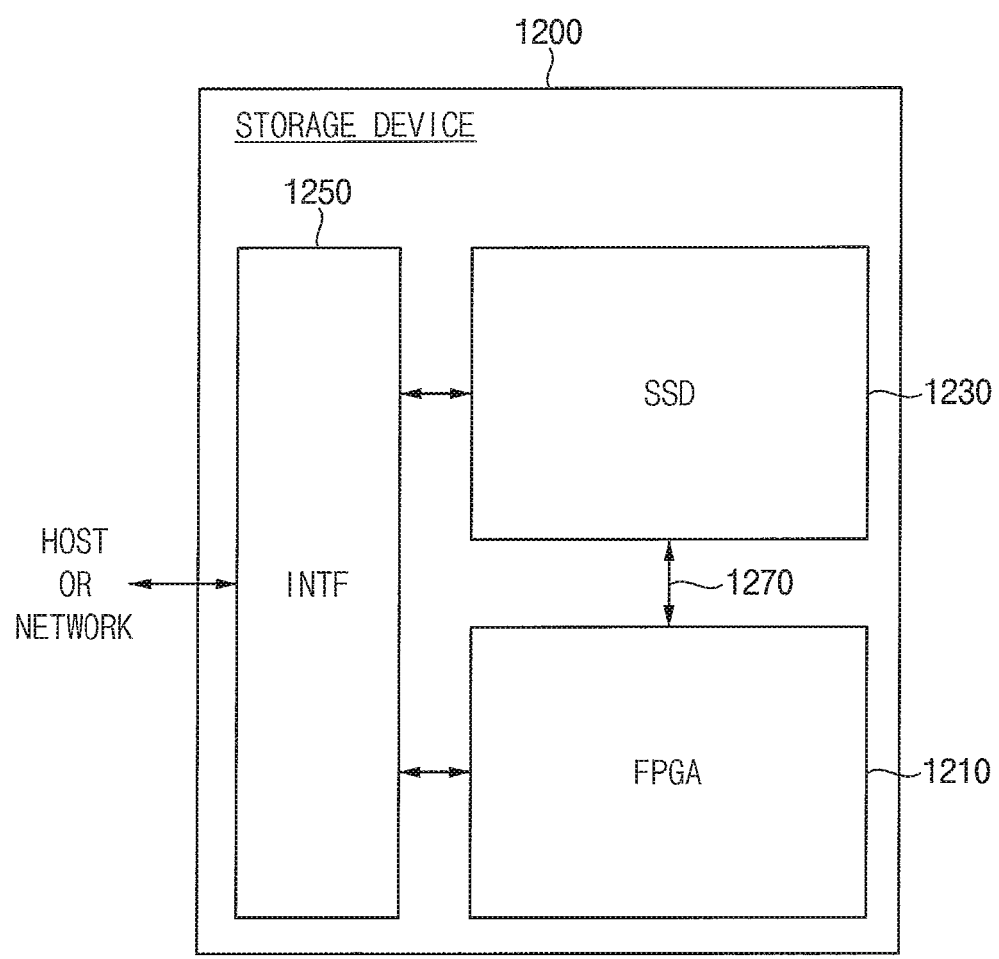
FIG. 9 is a block diagram illustrating one or more aspects of an example configuration of the storage device of FIGS. 7 and 8.

FIG. 9 is a block diagram illustrating an example configuration of the storage device of FIGS. 7 and 8.

Referring to FIGS. 7 and 9, the host device 1100 and the storage device 1200 constitute the system 1000.

As described in more detail herein (e.g., with reference to FIG. 7), the host device 1100 may include the central processing unit CPU 1120, the host memory 1150, the system bus 1190, and a memory management unit MMU 1160. It should be understood that the host device 1100 further includes components such as the graphics processing unit 1130 and the network interface card 1170. However, for convenience of description, some functions of the components of the host device 1100 may not be here described and/or some of the components may not be illustrated. The central processing unit 1110, the host memory 1150, and the system bus 1190 are substantially the same as those of FIG. 7, and thus, additional description may be omitted to avoid redundancy.

The host device 1100 may map a buffer (e.g., the buffer in 1235 in FIG. 10A) of the SSD 1230 onto a virtual memory space of the host device 1100. In general, a storage device such as the SSD 1230 does not open the buffer 1235, which is a memory space for direct memory access (DMA), for any other device. Accordingly, the host device 1100 may register the buffer 1235 at a virtual memory space to manage the buffer 1235 through one map. To this end, the host device 1100 may include a memory management unit. During booting or initialization of the system 1000, the buffer 1235 may be opened to an external device for transmission of stream data by mapping a physical address region of the buffer 1235 of the SSD 1230 onto a virtual memory space. An access of an external device to the virtual memory space may be redirected to the buffer 1235 by the memory management unit.

The storage device 1200 processes data provided from the host device 1100 or the SSD 1230 in an in-storage computing manner in response to a request of the host device 1100. The storage device 1200 may return a result of the in-storage computing to the host device 1100. To this end, the storage device 1200 may include the FPGA 1210, the SSD 1230, and an interface circuit or a host interface 1250. As described herein, the host interface 1250 may include a network interface cart, and the storage device 1200 may be connected directly to the host device 1100 or directly to the communication network forming the blockchain network.

The host interface 1250 is provided as a physical communication channel of the storage device 1200, which is used for data exchange with the host device 1100. The host interface 1250 may have an interfacing protocol supporting DMA functions of the FPGA 1210 and the SSD 1230. For example, the buffer 1235 of the SSD 1230 may be managed in the virtual memory space by the memory management unit 1160 of the host device 1100 and the host interface 1250.

The SSD 1230 and the FPGA 1210 may be connected directly through an internal bus 1270 without passing through the host interface 1250. For example, the internal bus 1270 may be an inter-integrated circuit (I2C) bus.

Even though not illustrated in FIG. 9, the storage device 1200 may further include various elements. For example, the storage device 1200 may include a power management integrated circuit (PMIC) to control overall power of the storage device 1200, a clock generator to control an operation frequency of a clock signal of the storage device 1200, a voltage regulator to control an operation voltage of the storage device 1200, etc.

Figure 10A:
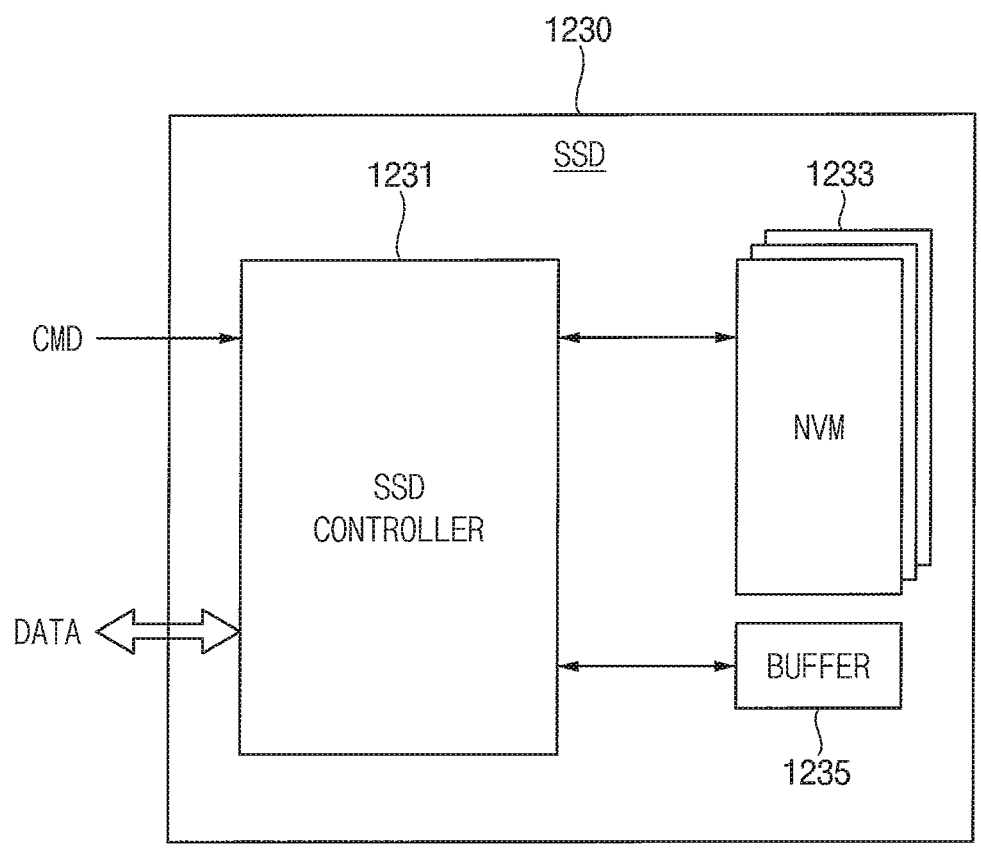
FIG. 10A is a block diagram illustrating one or more aspects of a solid state drive (SSD) included in a storage device according to example embodiments of the present disclosure.
Figure 10B:
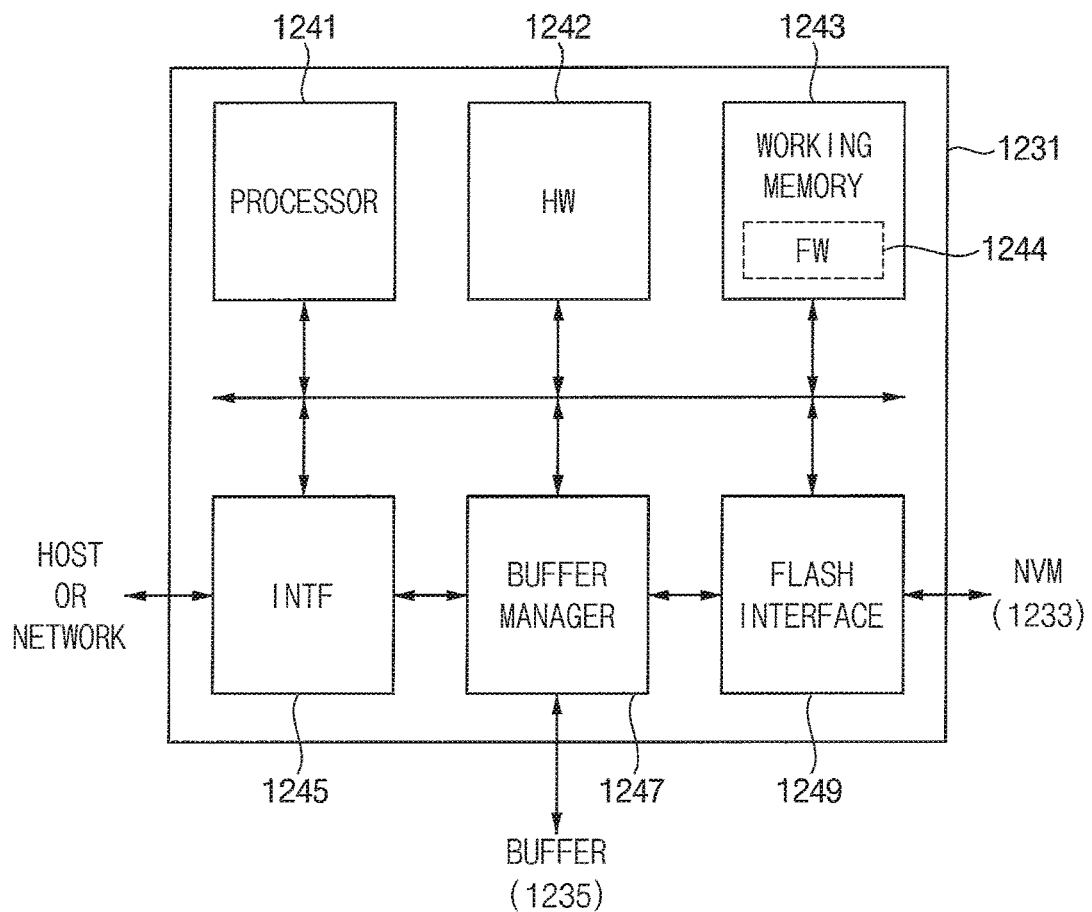
FIG. 10B is a block diagram illustrating one or more aspects of an example embodiment of an SSD controller included in the SSD of FIG. 10A.

FIG. 10A is a block diagram illustrating a solid state drive (SSD) included in a storage device according to example embodiments, and FIG. 10B is a block diagram illustrating an example embodiment of an SSD controller included in the SSD of FIG. 10A.

Referring to FIG. 10A, the SSD 1230 may include an SSD controller 1231, a nonvolatile memory device(s) 1233, and a buffer 1235.

The SSD controller 1231 may provide interfacing between an external device and the SSD 1230. The SSD controller 1231 accesses the nonvolatile memory device 1233 with reference to a stream ID, an LBA list, and a chunk size included in the streaming access command provided from the outside. For example, in the case where the streaming access command corresponds to a read command, the SSD controller 1231 prefetches data corresponding to the LBA list from the nonvolatile memory device 1233 in a unit of the chunk size and loads the prefetched data onto the buffer 1235. In contrast, in the case where the streaming access command corresponds to a write command, the SSD controller 1231 may program write data (DATA) loaded onto the buffer 1235 from the outside in the unit of the chunk size in the nonvolatile memory device 1233.

Referring to FIG. 10B, the SSD controller 1231 may include a processor 1241, a hardware HW 1242, a working memory 1243, a host interface 1245, a buffer manager 1247, and a flash interface 1249. In some aspects, some modules (e.g., namespace management module, etc.) may be implemented as firmware 1244 or the hardware 1242. In some cases, one or more aspects of the techniques described herein may be implemented via software. Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

The processor 1241 may execute the firmware 1244 loaded onto the working memory 1243. As the firmware 1244 is executed, the processor 1241 may transfer various control information necessary to perform a read/write operation to registers of the host interface 1245 and flash interface 1249. For example, in the case where the streaming access command is received from the outside, the streaming access command is stored in a command register (not illustrated) of the host interface 1245. The host interface 1245 may notify the processor 1241 that the read/write command is input to the processor 1241, based on the stored command. The processor 1241 may parse the streaming access command transferred to the host interface 1245 to control the buffer manager 1247 and the flash interface 1249.

The working memory 1243 may store data that are used to drive the SSD controller 1231. For example, various firmware 1244 to be executed by the SSD controller 1231 may be loaded onto the working memory 1243. For example, a flash translation layer (FTL) to be executed by the processor 1241 or a firmware image such as the namespace management module according to example embodiments may be loaded onto the working memory 1243 and may be executed by the processor 1241.

The host interface 1245 provides a physical connection between the host device 1100 or an external device and the SSD 1230. For example, the host interface 1245 provides interfacing with the SSD 1230, which complies with a bus format of the host device 1100. The bus format of the host device 1100 may include for example at least one of Universal Serial Bus (USB), Small Computer System Interface (SCSI), Peripheral Component Interface express (PCIe), Advanced Technology Attachment (ATA), parallel ATA (PATA), serial ATA (SATA), a serial attached SCSI (SAS), NVMe, and NVMe over Fabrics (NVMe-oF).

The flash interface 1249 exchanges data with the nonvolatile memory device 1233. The flash interface 1249 writes data transferred from the buffer 1235 in the nonvolatile memory device 1233. The flash interface 129 may transfer the data read from the nonvolatile memory device 1233 to the buffer 1235.

Figure 11:
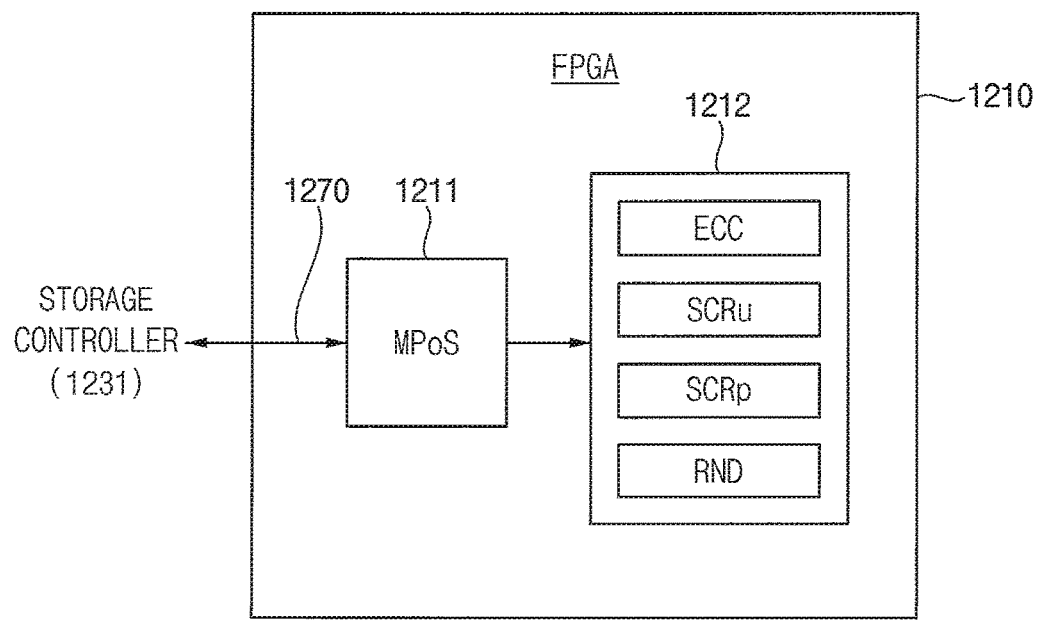
FIG. 11 is a block diagram illustrating one or more aspects of a field programmable gate array (FPGA) included in a storage device according to example embodiments of the present disclosure.

FIG. 11 is a block diagram illustrating a field programmable gate array (FPGA) included in a storage device according to example embodiments.

Referring to FIG. 11, an FPGA 1210 may include a proof of space (PoS) module MPoS 420 and a processing unit 440.

As described herein, the PoS module 420 may perform the PoS processing of the PoS data provided through the internal bus 1270.

The processing unit 440 may be implemented to perform various functions. For example, the processing unit 440 may include an error correction code engine ECC configured to perform ECC encoding and ECC decoding of data, a user security module SCRu configured to perform encryption and decryption of the user data, a PoS security module SCRp configured to perform encryption and decryption of the PoS data, a randomizer RND configured to perform randomizing and derandomizing of data.

Figure 12:
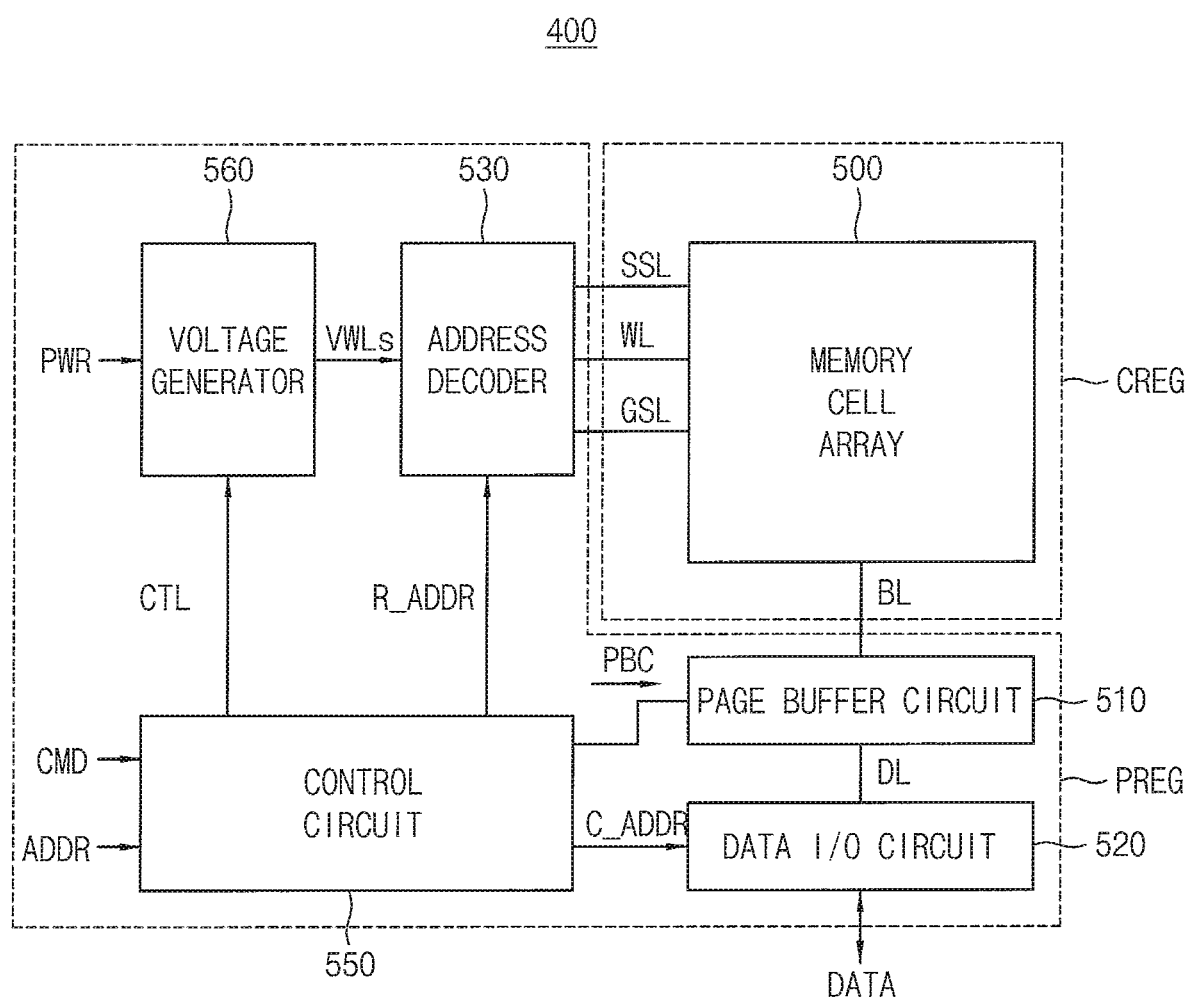
FIG. 12 is a block diagram illustrating one or more aspects of a nonvolatile memory device included in a storage device according to example embodiments of the present disclosure.

FIG. 12 is a block diagram illustrating a nonvolatile memory device included in a storage device according to example embodiments.

Referring to FIG. 12, a nonvolatile memory device 400 may include a memory cell array 500, a page buffer circuit 510, a data input/output (I/O) circuit 520, an address decoder 530, a control circuit 550 and a voltage generator 560. The memory cell array 500 may be disposed in a cell region CREG in FIG. 20, and the page buffer circuit 510, the data I/O circuit 520, the address decoder 530, the control circuit 550 and the voltage generator 560 may be disposed in a peripheral region PREG in FIG. 20. In some aspects, a decoder may include, or refer to, a logic circuit used to convert binary information from coded inputs to unique outputs.

Memory device 400 includes a memory cell array 500 that retains data stored therein, even when the memory device 400 is not powered on. In some examples, the memory cell array 500 may include as memory cells, for example, a NAND or NOR flash memory, a magneto-resistive random-access memory (MRAM), a resistive random-access memory (RRAM), a ferroelectric access-memory (FRAM), or a phase change memory (PCM). For example, when the memory cell array 500 includes a NAND flash memory, the memory cell array 500 may include a plurality of blocks and a plurality of pages. In some examples, data (e.g., user data) may be programmed and read in units of pages, and data may be erased in units of blocks.

In at least one embodiment, the memory cell array 500 is coupled to the address decoder 530 through string selection lines SSL, wordlines WL, and ground selection lines GSL. In addition, the memory cell array 500 may be coupled to the page buffer circuit 510 through a bitlines BL. The memory cell array 500 may include a memory cells coupled to the wordlines WL and the bitlines BL. In some example embodiments, the memory cell array 500 may be a three-dimensional memory cell array, which is formed on a substrate in a three-dimensional structure (for example, a vertical structure). In such examples, the memory cell array 500 may include cell strings (e.g., NAND strings) that are vertically oriented such that at least one memory cell is overlapped vertically with another memory cell.

The control circuit 550 may receive a command (signal) CMD and an address (signal) ADDR from a memory controller. Accordingly, the control circuit 550 may control erase, program and read operations of the nonvolatile memory device 400 in response to (or based on) at least one of the command signal CMD and the address signal ADDR. An erase operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 550 may generate the control signals CTL used to control the operation of the voltage generator 560, and may generate the page buffer control signal PBC for controlling the page buffer circuit 510 based on the command signal CMD, and generate the row address R_ADDR and the column address C_ADDR based on the address signal ADDR. The control circuit 550 may provide the row address R_ADDR to the address decoder 530 and provide the column address C_ADDR to the data I/O circuit 520.

In at least one embodiment, the address decoder 530 is coupled to the memory cell array 500 through the string selection lines SSL, the wordlines WL, and the ground selection lines GSL. During the program operation or the read operation, the address decoder 530 may determine or select one of the wordlines WL as a selected wordline and determine the remaining wordlines WL except for the selected wordline as unselected wordlines based on the row address R_ADDR.

During the program operation or the read operation, the address decoder 530 may determine one of the string selection lines SSL as a selected string selection line and determine rest of the string selection lines SSL except for the selected string selection line as unselected string selection lines based on the row address R_ADDR.

The voltage generator 560 may generate wordline voltages VWL, which are used for the operation of the memory cell array 500 of the nonvolatile memory device 400, based on the control signals CTL. The voltage generator 560 may receive power PWR from the memory controller. The wordline voltages VWL may be applied to the wordlines WL through the address decoder 530.

For example, during the erase operation, the voltage generator 560 may apply an erase voltage to a well and/or a common source line of a memory block and apply an erase permission voltage (e.g., a ground voltage) to all or a portion of the wordlines of the memory block based on an erase address. During the erase verification operation, the voltage generator 560 may apply an erase verification voltage simultaneously to all of the wordlines of the memory block or sequentially (e.g., one by one) to the wordlines.

For example, during the program operation, the voltage generator 560 may apply a program voltage to the selected wordline and may apply a program pass voltage to the unselected wordlines. In addition, during the program verification operation, the voltage generator 560 may apply a program verification voltage to the first wordline and may apply a verification pass voltage to the unselected wordlines.

During the normal read operation, the voltage generator 560 may apply a read voltage to the selected wordline and may apply a read pass voltage to the unselected wordlines. During the data recover read operation, the voltage generator 560 may apply the read voltage to a wordline adjacent to the selected wordline and may apply a recover read voltage to the selected wordline.

In at least one embodiment, the page buffer circuit 510 is coupled to the memory cell array 500 through the bitlines BL. The page buffer circuit 510 may include multiple buffers. In some example embodiments, each buffer may be connected to a single bitline. In other example embodiments, each buffer may be connected to two or more bitlines. The page buffer circuit 510 may temporarily store data to be programmed in a selected page or data read out from the selected page of the memory cell array 500.

In at least one embodiment, the data I/O circuit 520 is coupled to the page buffer circuit 510 through data lines DL. During the program operation, the data I/O circuit 520 may receive program data DATA received from the memory controller and provide the program data DATA to the page buffer circuit 510 based on the column address C_ADDR received from the control circuit 550. During the read operation, the data I/O circuit 520 may provide read data DATA, having been read from the memory cell array 500 and stored in the page buffer circuit 510, to the memory controller based on the column address C_ADDR received from the control circuit 550.

In addition, the page buffer circuit 510 and the data I/O circuit 520 may read data from a first area of the memory cell array 500 and write the read data to a second area of the memory cell array 500 (e.g., without transmitting the data to a source external to the nonvolatile memory device 400, such as to the memory controller). For example, the page buffer circuit 510 and the data I/O circuit 520 may perform a copy-back operation.

Figure 13:
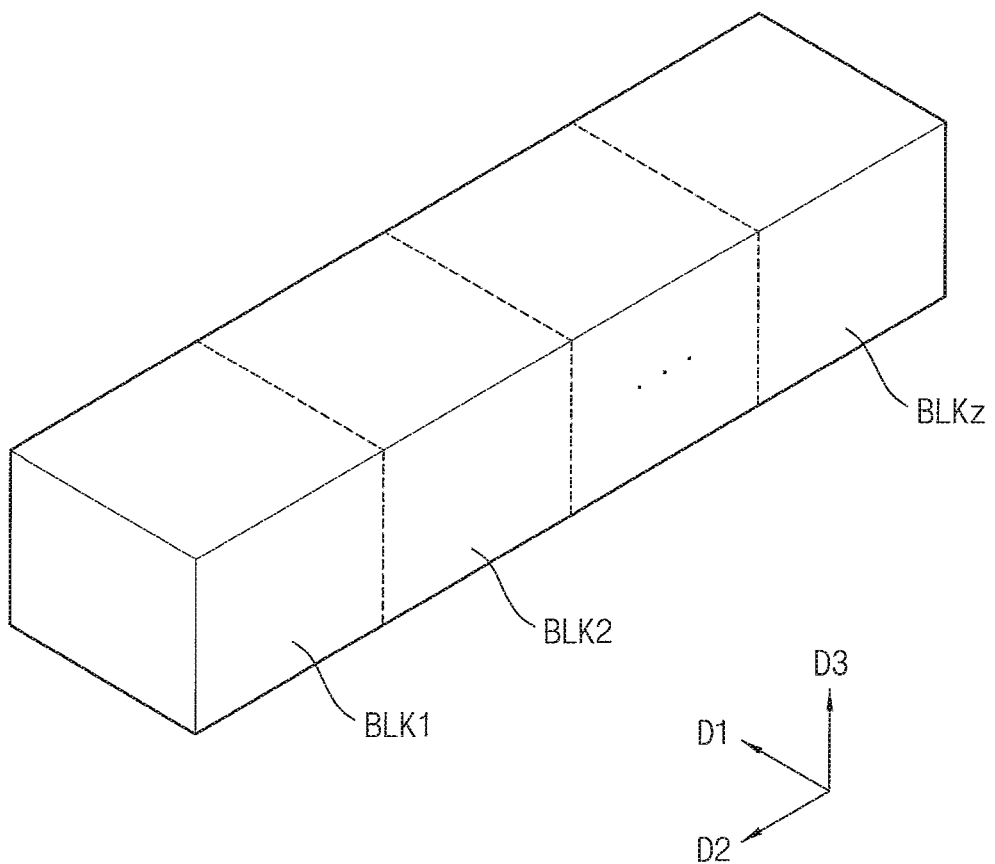
FIG. 13 is a block diagram illustrating one or more aspects of a memory cell array included in the nonvolatile memory device of FIG. 12.
Figure 14:
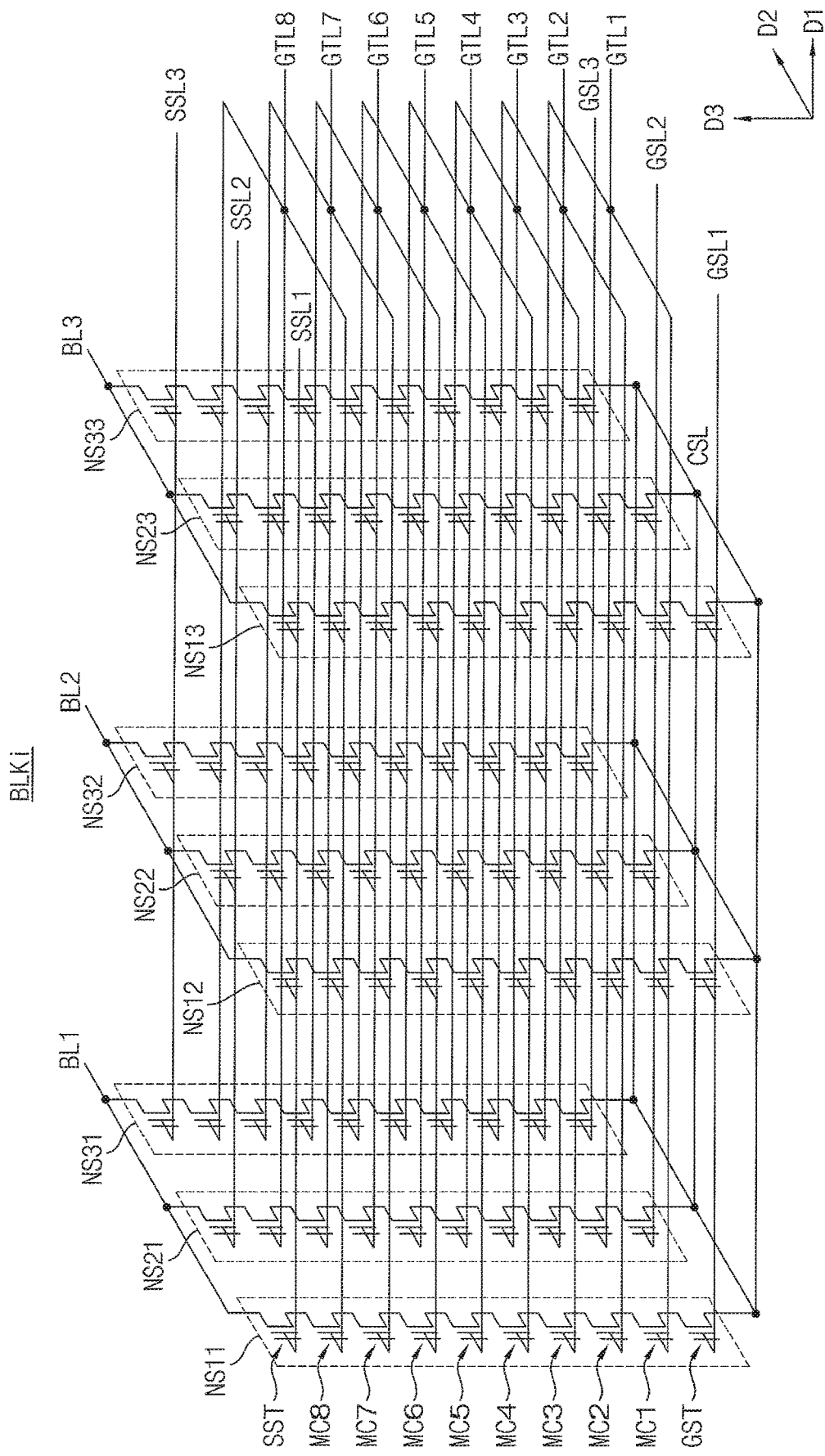
FIG. 14 is a circuit diagram illustrating one or more aspects of an equivalent circuit of a memory block included in the memory cell array of FIG. 13.

FIG. 13 is a block diagram illustrating a memory cell array included in the nonvolatile memory device of FIG. 12, and FIG. 14 is a circuit diagram illustrating an equivalent circuit of a memory block included in the memory cell array of FIG. 13.

Referring to FIG. 13, the memory cell array 500 includes memory blocks BLK1 to BLKz. In some example embodiments, the memory blocks BLK1 to BLKz may be selected by the address decoder 430 of FIG. 12. For example, the address decoder 430 may select a particular memory block BLK among the memory blocks BLK1 to BLKz corresponding to a block address.

In at least one embodiment, the memory block BLKi of FIG. 14 is formed on a substrate in a three-dimensional structure (for example, a vertical structure). For example, NAND strings or cell strings included in the memory block BLKi may be disposed in the vertical direction D3 perpendicular to the upper surface of the substrate.

Referring to FIG. 14, the memory block BLKi may include NAND strings NS11 to NS33 coupled between bitlines BL1, BL2 and BL3 and a common source line CSL. Each of the NAND strings NS11 to NS33 may include a string selection transistor SST, a memory cells MC1 to MC8, and a ground selection transistor GST. In FIG. 14, each of the NAND strings NS11 to NS33 is illustrated to include eight memory cells MC1 to MC8. However, embodiments are not limited thereto. In some embodiments, each of the NAND strings NS11 to NS33 may include any number of memory cells.

Each string selection transistor SST may be connected to a corresponding string selection line (for example, one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (for example, one of GSL1 to GSL3). Each string selection transistor SST may be connected to a corresponding bitline (e.g., one of BL1, BL2 and BL3), and each ground selection transistor GST may be connected to the common source line CSL.

Wordlines (e.g., the gate line GTL1) having the same height may be commonly connected, and the ground selection lines GSL1 to GSL3 and the string selection lines SSL1 to SSL3 may be separated. In FIG. 15, the memory block BLKi is illustrated to be coupled to eight gate lines GTL1 to GTL8 and three bitlines BL1 to BL3. However, example embodiments are not limited thereto. Each memory block in the memory cell array 500 may be coupled to any number of wordlines and any number of bitlines.

FIG. 15 is a diagram illustrating an example format of a command that is transferred from a host device to a storage device, and FIG. 16 is a diagram illustrating an example format of a lowest double word included in the command of FIG. 15. The formats of FIGS. 15 and 16 may be for standard commands that are specified in the NVMe standards.

Referring to FIG. 15, each command may have a predetermined size, for example, 64 bytes. In FIG. 15, a lowest double word CDW0 may be common to all commands A double word corresponds to four bytes. A namespace identifier (NSID) field may specify a namespace ID to which a command is applied. If the namespace ID is not used for the command, then NSID field may be cleared to 0 h. The 08 through 15 bytes may be reserved. A metadata pointer (MPTR) field may be valid and used only if the command includes metadata. A physical region page (PRP) entry field may specify data used by the command. The upper double words CDW10 through CDW15 may have specific usage for each command.

Referring to FIG. 16, the lowest double word CDW0 may have a predetermined size, for example, four bytes. Important information may be intensively included in the first byte (BYTE=0). The bits B0~B3 of the first byte (BYTE=0) may include access frequency ACCFRQ for a memory region of an address range that are access-requested. In other words, information for write request frequency or read request frequency may be included in the bits B0~B3 of the first byte (BYTE=0). The bits B4 and B5 of the first byte (BYTE=0) may include information on access latency ACCLAT. The access latency for the requested data may be defined by the values of the bits B4 and B5 of the first byte (BYTE=0). The bit B6 of the first byte (BYTE=0) may represent whether the corresponding command is one of the sequential commands. For example, the corresponding command may be one of the sequential commands when the value of the bit B6 is '1', and the information on the sequential commands may not be available when the value of the bit B6 is '0'. The bit B7 of the first byte (BYTE=0) may represent whether the access-requested data are compressed or not. For example, the data may be compressed when the value of the bit B7 is '1' and the information on the data compression may be available when the value of the bit B7 is '1'.

In some example embodiments, the stream identifiers STID are included in the second byte (BYTE=1). In other example embodiments, the stream identifiers STID may be included in the reserved bytes (BYTE=2 and 3).

In some example embodiments, the user data and the PoS data are transferred through different streams corresponding to different stream identifiers STID. In such examples, the interface circuit in the storage device may differentiate the PoS data from the user data based on the stream identifiers STID regardless of the NSID field.

FIGS. 17A, 17B, 18A and 18B are diagrams for describing operations of generating, setting and managing namespaces in a storage device according to example embodiments.

Figure 17A:
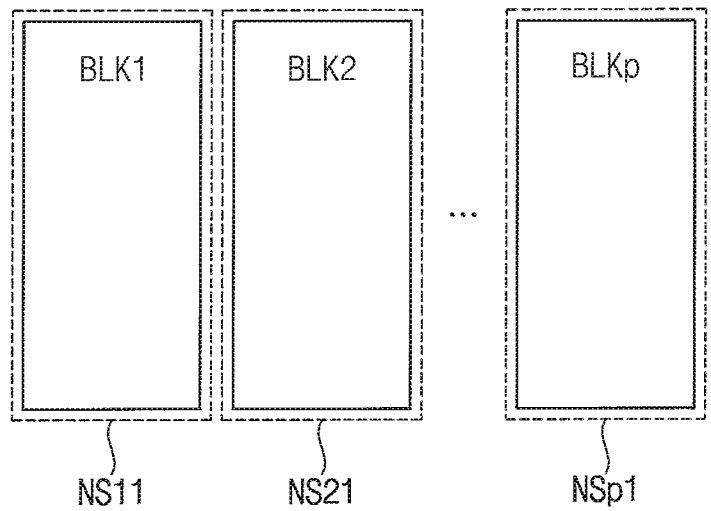
FIGS. 17A, 17B, 18A and 18B are diagrams for describing one or more aspects of operations of generating, setting and managing namespaces in a storage device according to example embodiments of the present disclosure.

Referring to FIG. 17A, an example of generating and setting a plurality of namespaces NS11, NS21, ..., NSp1 on a plurality of memory blocks BLK1, BLK2, ..., BLKp is illustrated, where p is a natural number greater than or equal to two. For example, the plurality of memory blocks BLK1, BLK2, . . . , BLKp may be included in one storage device, and thus the plurality of namespaces NS11, NS21, . . . , NSp1 may also be included in one storage device.

In an example of FIG. 17A, one namespace is generated and set on one memory block. For example, the namespace NS11 may be generated and set on the entire region of the memory block BLK1, the namespace NS21 may be generated and set on the entire region of the memory block BLK2, and the namespace NSp1 may be generated and set on the entire region of the memory block BLKp.

In some example embodiments, the plurality of namespaces NS11, NS21, . . . , NSp1 may have the same capacity or different capacities. Although FIG. 17A illustrates that the number of namespaces NS11, NS21, . . . , NSp1 is equal to the number of the memory blocks BLK1, BLK2, . . . , BLKp, example embodiments are not limited thereto, and the number of namespaces and the number of memory blocks may be changed according to example embodiments.

Figure 17B:
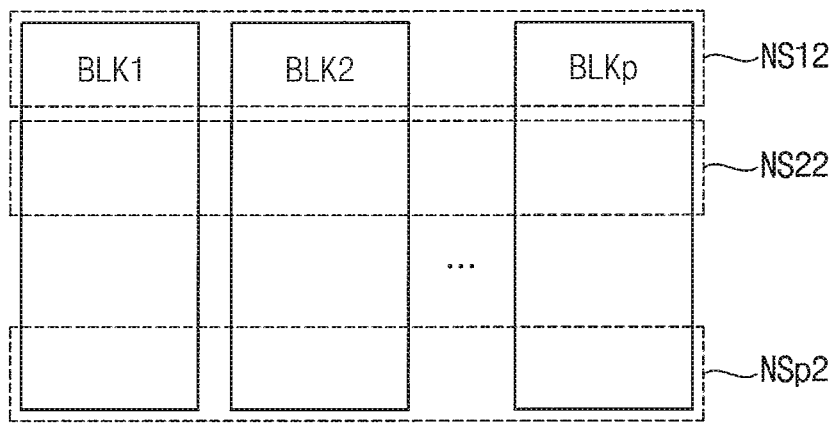

Referring to FIG. 17B, another example of generating and setting a plurality of namespaces NS12, NS22, . . . , NSp2 on a plurality of memory blocks BLK1, BLK2, . . . , BLKp is illustrated. The repetitive descriptions in view of FIG. 17A will be omitted.

In an example of FIG. 17B, one namespace is generated and set on all of the plurality of memory blocks BLK1, BLK2, . . . , BLKp. For example, the namespace NS12 may be generated and set on some regions of all of the plurality of memory blocks BLK1, BLK2, BLKp, the namespace NS22 may be generated and set on some other regions of all of the plurality of memory blocks BLK1, BLK2, . . . , BLKp, and the namespace NSp2 may be generated and set on some other regions of all of the plurality of memory blocks BLK1, BLK2, . . . , BLKp.

Although not illustrated in FIGS. 17A and 17B, the operation of generating and setting the namespace may be changed according to example embodiments. For example, one namespace may be generated and set on the entire regions or partial regions of some memory blocks (e.g., the memory blocks BLK1 and BLK2).

Figure 18A:
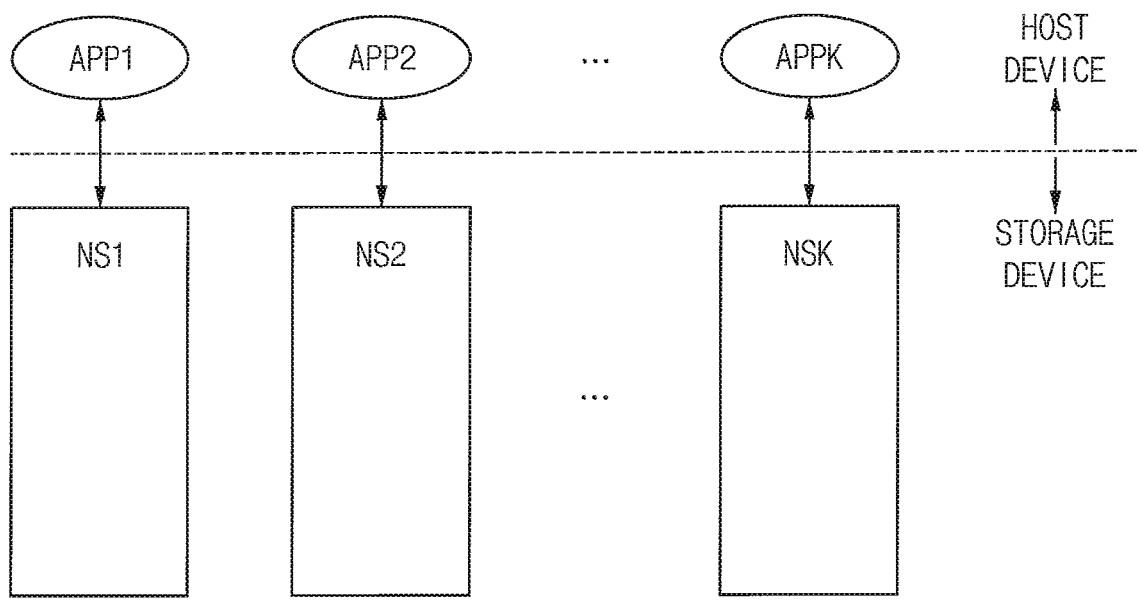

Referring to FIG. 18A, an example or allocating or assigning a plurality of namespaces NS1, NS2, . . . , NSK is illustrated. For example, the plurality of namespaces NS1, NS2, . . . , NSK may be included in one storage device.

In an example of FIG. 18A, each of a plurality of applications APP1, APP2, . . . , APPK is allocated to a respective one of the plurality of namespaces NS1, NS2, . . . , NSK depending on the types and characteristics of the plurality of applications APP1, APP2, . . . , APPK that are executed or run on a host device (e.g., the host device 1110 in FIG. 7). For example, the namespace NS1 may be allocated to the application APP1, the namespace NS2 may be allocated to the application APP2, and the namespace NSK may be allocated to the application APPK.

In some example embodiments, each of the plurality of applications APP1, APP2, . . . , APPK are referred to as an application program, and may be an application software program that is executed on an operating system. For example, each of the plurality of applications APP1, APP2, . . . , APPK may be programmed to aid in generating, copying and deleting a file. For example, each of the plurality of applications APP1, APP2, . . . , APPK may provide various services such as a video application, a game application, a web browser application, etc. Each of the plurality of applications APP1, APP2, . . . , APPK may generate tasks, jobs and/or requests for using or accessing a respective one of the plurality of namespaces NS1, NS2, . . . , NSK (e.g., for performing data write/read/erase operations on a respective one of the plurality of namespaces NS1, NS2, . . . , NSK). In other words, in the example of FIG. 18A, a subject or party that performs the PoS consensus algorithm according to example embodiments may be one of the plurality of applications APP1, APP2, . . . , APPK.

In some example embodiments, only one namespace may be accessed by one application. In other example embodiments, two or more namespaces may be accessed simultaneously by two or more applications.

Figure 18B:
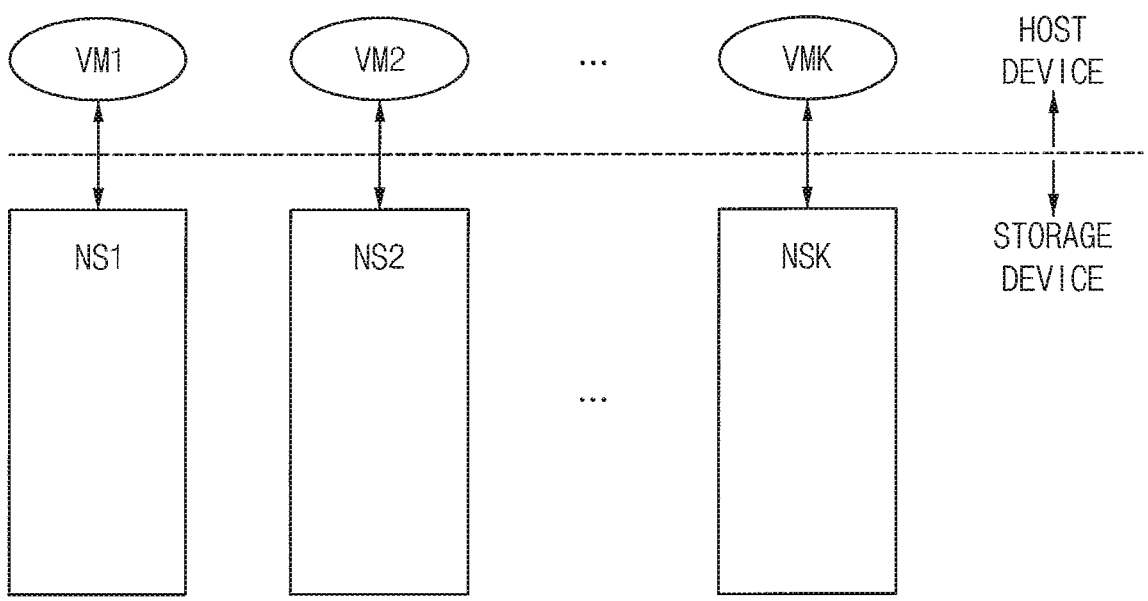

Referring to FIG. 18B, another example or allocating or assigning a plurality of namespaces NS1, NS2, . . . , NSK is illustrated. The repetitive descriptions in view of FIG. 18A will be omitted.

For example, each of a plurality of virtual machines VM1, VM2, . . . , VM may be allocated to a respective one of the plurality of namespaces NS1, NS2, . . . , NSK depending on the types and characteristics of the plurality of virtual machines VM1, VM2, . . . , VM that are executed or run on the host device. For example, the namespace NS1 may be allocated to the virtual machine VM1, the namespace NS2 may be allocated to the virtual machine VM2, and the namespace NSK may be allocated to the virtual machine VMK.

In some example embodiments, the host device supports a virtualization function. For example, each of the plurality of virtual machines VM1, VM2, . . . , VM may be a virtualization core or processor generated by a virtualization operation, and may drive an operating system (OS) or an application independently. For example, the virtualization function and the virtualization operation may be performed using a VMware, a Single-Root IO Virtualization (SR-IOV), or the like. For example, an OS driven by a virtual machine may be referred to as, for example, a guest OS. Each of the plurality of virtual machines VM1, VM2, . . . , VM may generate tasks, jobs and/or requests for using or accessing a respective one of the plurality of namespaces NS1, NS2, . . . , NSK (e.g., for performing data write/read/erase operations on a respective one of the plurality of namespaces NS1, NS2, . . . , NSK). In other words, in the example of FIG. 18B, a subject or party that performs the PoS consensus algorithm according to example embodiments may be one of the plurality of virtual machines VM1, VM2, . . . , VM.

Figure 19:
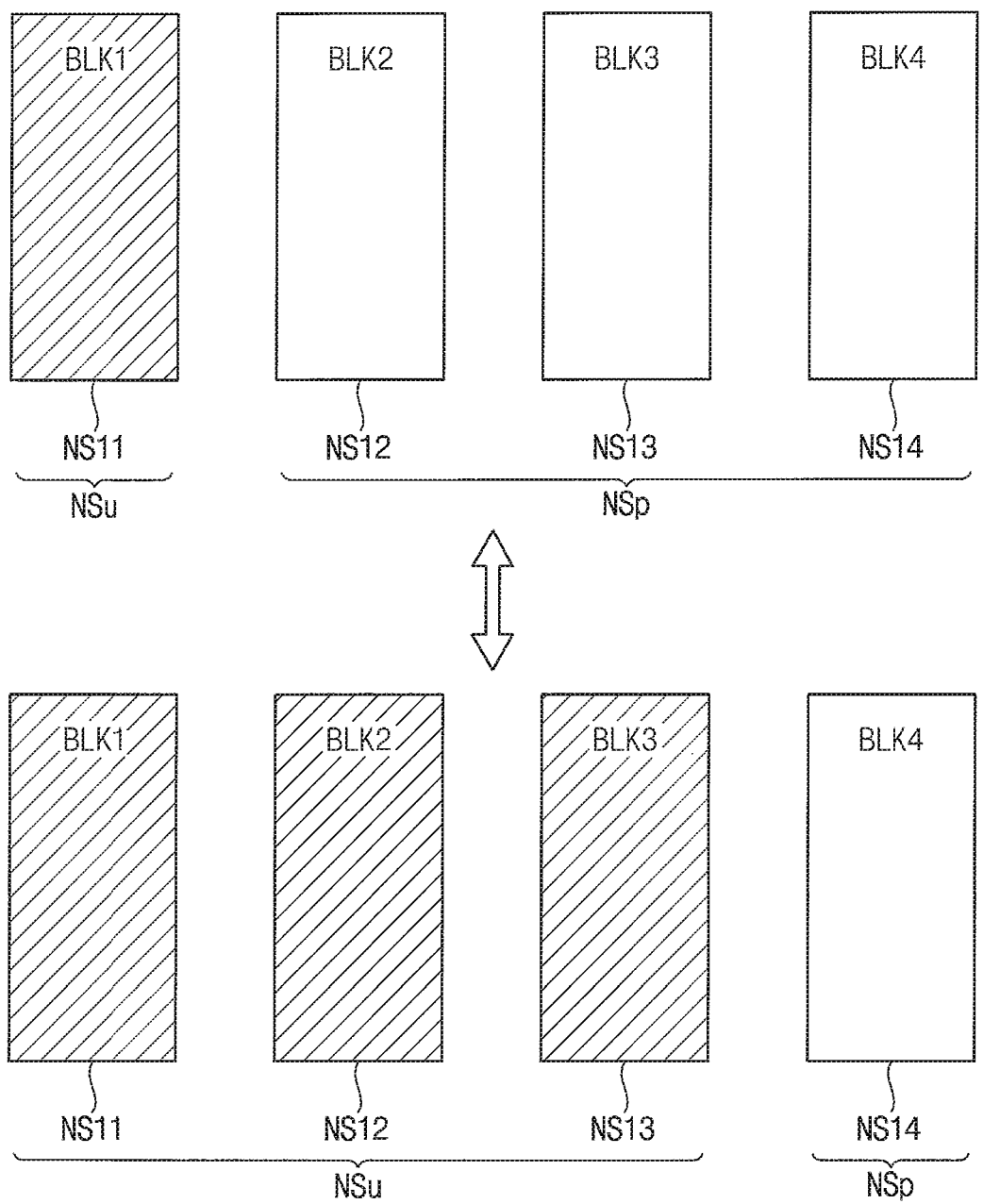
FIG. 19 is a diagram illustrating one or more aspects of adaptive setting of namespaces in a storage device according to example embodiments of the present disclosure.

FIG. 19 is a diagram illustrating adaptive setting of namespaces in a storage device according to example embodiments.

Referring to FIGS. 1 and 19, the namespace management module 120 may vary a first size of a storage space of the nonvolatile memory device 400 corresponding to the user namespace NSu and a second size of a storage space of the nonvolatile memory device 400 corresponding to the PoS namespace NSp.

As described herein, the memory cell array of the nonvolatile memory device 400 may include a plurality of memory blocks, and the namespace management module 120 may set the user namespace NSu and the PoS namespace NSp by units of a memory block.

For convenience of illustration and description, it may be assumed that the memory cell array includes four memory blocks BLK1~BLK4 as illustrated in FIG. 19.

For example, as illustrated in the upper portion of FIG. 19, the namespace management module 120 may set one namespace NS11 corresponding to the one memory block BLK1 to the user namespace NSu, and set three namespaces NS12, NS14 and NS14 corresponding to the three memory blocks BLK2, BLK3 and BLK4 to the PoS namespace NSp.

For another example, as illustrated in the lower portion of FIG. 19, the namespace management module 120 may set three namespaces NS11, NS12 and NS13 corresponding to the three memory blocks BLK1, BLK2 and BLK3 to the user namespace NSu, and set one namespace NS14 corresponding to the one memory block BLK4 to the PoS namespace NSp.

Such adaptive setting of namespaces may be performed by imposing priority to storing the user data, which is the original function of the storage device. In other words, the namespace management module 120 may determine the first size of the storage space corresponding to the user namespace NSu based on an amount of the user data stored in the nonvolatile memory device 400. After that, the namespace management module 120 may determine the second size of storage space corresponding to the PoS namespace NSp based on an entire size of the storage space of the nonvolatile memory device 400 subtracted by the first size.

As such, the storage device and the system according to example embodiments may enhance efficiency of the PoS algorithm by adaptively setting the size of the storage space corresponding to the user data and the size of the storage space corresponding to the PoS data.

Figure 20:
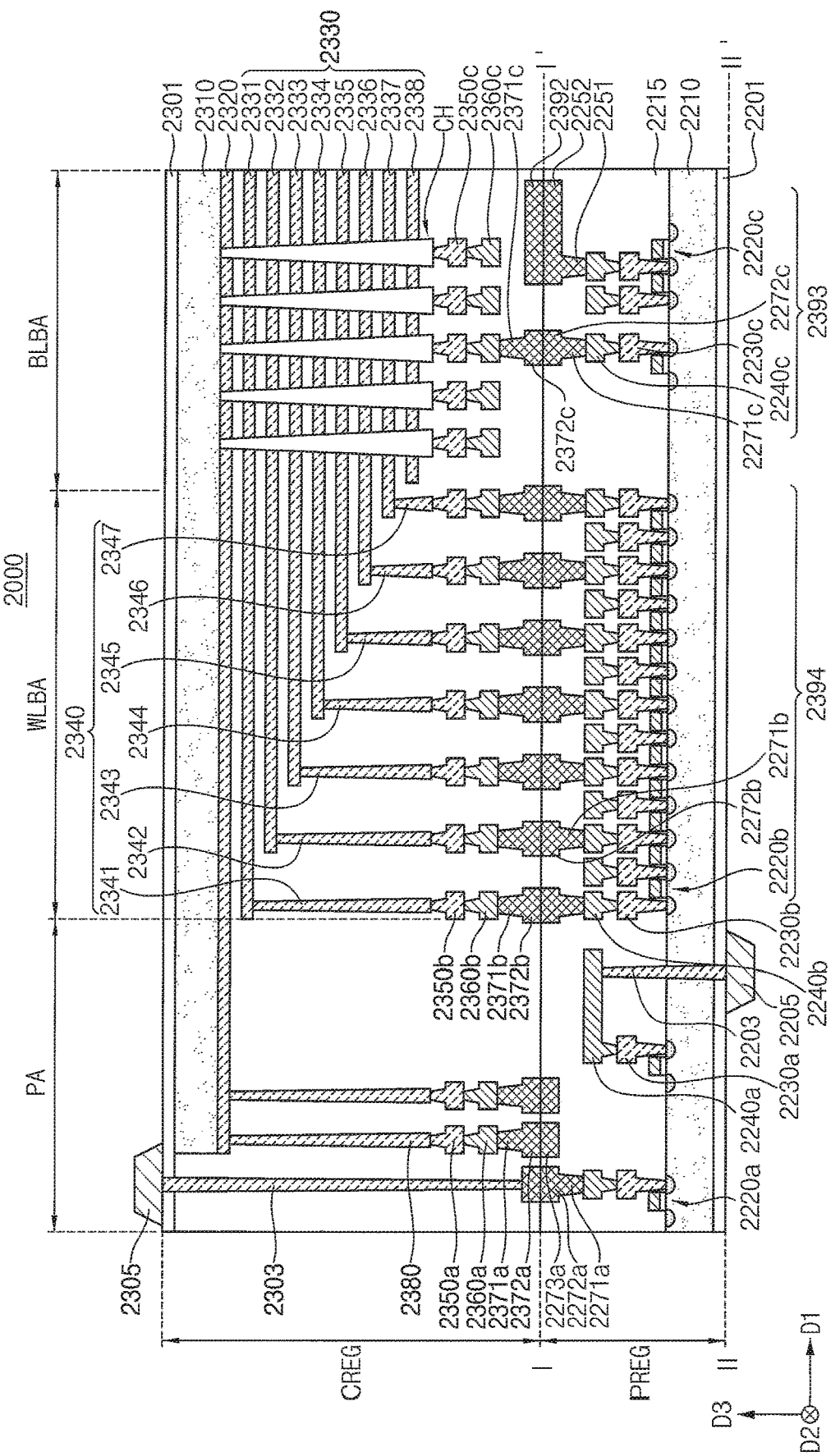
FIG. 20 is a cross-sectional diagram illustrating one or more aspects of a nonvolatile memory device according to example embodiments of the present disclosure.

FIG. 20 is a cross-sectional diagram illustrating a nonvolatile memory device according to example embodiments.

Referring to FIG. 20, a nonvolatile memory device 2000 may have a chip-to-chip (C2C) structure. Here, the term "C2C structure" denotes a structure in which an upper chip includes a memory cell region (e.g., the cell region CREG) on a first wafer, and a lower chip includes a peripheral circuit region (e.g., the peripheral region PREG) on a second wafer, in which the upper chip and the lower chip are bonded (or mounted) together at a surface I-I. In FIG. 20, the surface I-I' may correspond to upper surfaces of the upper chip and the lower chip, and the surface II-II' may correspond to a bottom surface of the lower chip. In this regard, the bonding process may include a method of electrically connecting a bonding metal formed on an uppermost metal layer of the upper chip and a bonding metal formed on an uppermost metal layer of the lower chip. For example, when the bonding metals include copper (Cu), Cu-to-Cu bonding may be utilized. Example embodiments, however, are not limited thereto. For example, the bonding metals may also be formed of aluminum (Al) or tungsten (W).

Each of the peripheral region PREG and the cell region CREG of the nonvolatile memory device 2000 may include an external pad bonding area PA, a wordline bonding area WLBA, and a bitline bonding area BLBA.

The peripheral region PREG may include a first substrate 2210, an interlayer insulating layer 2215, circuit elements 2220a, 2220b, and 2220c formed on the first substrate 2210, first metal layers 2230a, 2230b, and 2230c respectively connected to the circuit elements 2220a, 2220b, and 2220c, and second metal layers 2240a, 2240b, and 2240c formed on the first metal layers 2230a, 2230b, and 2230c. In some embodiments, the first metal layers 2230a, 2230b, and 2230c may be formed of tungsten having relatively high electrical resistivity, and the second metal layers 2240a, 2240b, and 2240c may be formed of copper having relatively low electrical resistivity.

Although only the first metal layers 2230a, 2230b, and 2230c and the second metal layers 2240a, 2240b, and 2240c are shown and described (e.g., such as in the example of FIG. 20), the techniques and systems described herein are not limited thereto. For example, in some embodiments, one or more additional metal layers may be further formed on the second metal layers 2240a, 2240b, and 2240c. At least a portion of the one or more additional metal layers formed on the second metal layers 2240a, 2240b, and 2240c may be formed of, for example, aluminum or the like having a lower electrical resistivity than those of copper forming the second metal layers 2240a, 2240b, and 2240c.

In at least one embodiment, the interlayer insulating layer 2215 is disposed on the first substrate 2210 and cover the circuit elements 2220a, 2220b, and 2220c, the first metal layers 2230a, 2230b, and 2230c, and the second metal layers 2240a, 2240b, and 2240c. The interlayer insulating layer 2215 may include an insulating material such as, for example, silicon oxide, silicon nitride, or the like.

In at least one embodiment, the lower bonding metals 2271b and 2272b is formed on the second metal layer 2240b in the wordline bonding area WLBA. In the wordline bonding area WLBA, the lower bonding metals 2271b and 2272b in the peripheral region PREG may be electrically bonded to upper bonding metals 2371b and 2372b of the cell region CREG. The lower bonding metals 2271b and 2272b and the upper bonding metals 2371b and 2372b may be formed of, for example, aluminum, copper, tungsten, or the like. The upper bonding metals 2371b and 2372b in the cell region CREG may be referred as first metal pads, and the lower bonding metals 2271b and 2272b in the peripheral region PREG may be referred as second metal pads.

The cell region CREG may include at least one memory block. The cell region CREG may include a second substrate 2310 and a common source line 2320. On the second substrate 2310, wordlines 2331, 2332, 2333, 2334, 2335, 2336, 2337, and 2338 (collectively, 2330) may be vertically stacked (in the direction D3 or a Z-axis) perpendicular to an upper surface of the second substrate 2310. At least one string selection line and at least one ground selection line may be arranged on and below the wordlines 2330, respectively, and the wordlines 2330 may be disposed between the at least one string selection line and the at least one ground selection line.

In the bitline bonding area BLBA, a channel structure CH may vertically extend perpendicular to the upper surface of the second substrate 2310, and pass through the wordlines 2330, the at least one string selection line, and the at least one ground selection line. The channel structure CH may include, for example, a data storage layer, a channel layer, a buried insulating layer, and the like. The channel layer may be electrically connected to a first metal layer 2350c and a second metal layer 2360c. For example, the first metal layer 2350c may be a bitline contact, and the second metal layer 2360c may be a bitline. In some examples, the bitline (e.g., the second metal layer 2360c) may extend in a second horizontal direction D2 (e.g., a Y-axis direction) parallel to the upper surface of the second substrate 2310.

In the illustrated example of FIG. 20, an area in which the channel structure CH, the bitline (the second metal layer 2360c), and the like are disposed is defined as the bitline bonding area BLBA. In the bitline bonding area BLBA, the bitline (the second metal layer 2360c) may be electrically connected to the circuit elements 2220c providing a page buffer 2393 in the peripheral region PREG. The bitline (the second metal layer 2360c) may be connected to upper bonding metals 2371c and 2372c in the cell region CREG, and the upper bonding metals 2371c and 2372c may be connected to lower bonding metals 2271c and 2272c connected to the circuit elements 2220c of the page buffer 2393.

In the wordline bonding area WLBA, the wordlines 2330 may extend in a first horizontal direction D1 (e.g., an X-axis direction) parallel to the upper surface of the second substrate 2310 and perpendicular to the second horizontal direction D2, and may be connected to cell contact plugs 2341, 2342, 2343, 2344, 2345, 2346, and 2347 (collectively, 2340). The wordlines 2330 and the cell contact plugs 2340 may be connected to each other in pads provided by at least a portion of the wordlines 2330 extending in different lengths in the first horizontal direction D1. A first metal layer 2350b and a second metal layer 2360b may be connected to an upper portion of the cell contact plugs 2340 connected to the wordlines 2330, sequentially. The cell contact plugs 2340 may be connected to the peripheral region PREG by the upper bonding metals 2371b and 2372b of the cell region CREG and the lower bonding metals 2271b and 2272b of the peripheral region PREG in the wordline bonding area WLBA.

In at least one embodiment, the cell contact plugs 2340 are electrically connected to the circuit elements 2220b forming a row decoder 2394 in the peripheral region PREG. In some examples, operating voltages of the circuit elements 2220b forming the row decoder 2394 may be different than operating voltages of the circuit elements 2220c forming the page buffer 2393. For example, operating voltages of the circuit elements 2220c forming the page buffer 2393 may be greater than operating voltages of the circuit elements 2220b forming the row decoder 2394.

In at least one embodiment, the common source line contact plug 2380 is disposed in the external pad bonding area PA. The common source line contact plug 2380 may be formed of a conductive material such as, for example, a metal, a metal compound, polysilicon, or the like, and may be electrically connected to the common source line 2320. A first metal layer 2350a and a second metal layer 2360a may be stacked on an upper portion of the common source line contact plug 2380, sequentially. For example, an area in which the common source line contact plug 2380, the first metal layer 2350a, and the second metal layer 2360a are disposed may be defined as the external pad bonding area PA.

In at least one embodiment, I/O pads 2205 and 2305 are disposed in the external pad bonding area PA. A lower insulating film 2201 covering a lower surface of the first substrate 2210 may be formed below the first substrate 2210, and a first I/O pad 2205 may be formed on the lower insulating film 2201. The first I/O pad 2205 may be connected to at least one of the circuit elements 2220a, 2220b, and 2220c disposed in the peripheral region PREG through a first I/O contact plug 2203, and may be separated from the first substrate 2210 by the lower insulating film 2201. In addition, a side insulating film may be disposed between the first I/O contact plug 2203 and the first substrate 2210 to electrically separate the first I/O contact plug 2203 and the first substrate 2210.

In at least one embodiment, the upper insulating film 2301 covering the upper surface of the second substrate 2310 is formed on the second substrate 2310, and a second I/O pad 2305 may be disposed on the upper insulating film 2301. The second I/O pad 2305 may be connected to at least one of the circuit elements 2220a, 2220b, and 2220c disposed in the peripheral region PREG through a second I/O contact plug 2303. In some embodiments, the second I/O pad 2305 is electrically connected to a circuit element 2220a.

In some embodiments, the second substrate 2310 and the common source line 2320 are not disposed in an area in which the second I/O contact plug 2303 is disposed. Also, in some embodiments, the second I/O pad 2305 does not overlap the wordlines 2330 in the vertical direction D3 (e.g., the Z-axis direction). The second I/O contact plug 2303 may be separated from the second substrate 2310 in the direction parallel to the upper surface of the second substrate 310, and may pass through the interlayer insulating layer 2315 of the cell region CREG to be connected to the second I/O pad 2305.

According to embodiments, the first I/O pad 2205 and the second I/O pad 2305 are selectively formed. For example, in some embodiments, the nonvolatile memory device 2000 may include only the first I/O pad 2205 disposed on the first substrate 2210 or the second I/O pad 2305 disposed on the second substrate 2310. Alternatively, in some embodiments, the memory device 200 may include both the first I/O pad 2205 and the second I/O pad 2305.

In at least one embodiment, a metal pattern provided on an uppermost metal layer is provided as a dummy pattern or the uppermost metal layer may be absent, in each of the external pad bonding area PA and the bitline bonding area BLBA, respectively included in the cell region CREG and the peripheral region PREG.

In the external pad bonding area PA, the nonvolatile memory device 2000 may include lower metal patterns 2271a 2272a and 2273a, corresponding to upper metal patterns 2371a and 2372a formed in an uppermost metal layer of the cell region CREG, and having the same cross-sectional shape as the upper metal pattern 2372a of the cell region CREG so as to be connected to each other, in an uppermost metal layer of the peripheral region PREG. In some embodiments, in the peripheral region PREG, the lower metal pattern 2273a formed in the uppermost metal layer of the peripheral region PREG is not connected to a contact. In similar manner, in the external pad bonding area PA, an upper metal pattern 2372a, corresponding to the lower metal pattern 2273a formed in an uppermost metal layer of the peripheral region PREG, and having the same shape as a lower metal pattern 2273a of the peripheral region PREG, may be formed in an uppermost metal layer of the cell region CREG.

In at least one embodiment, the lower bonding metals 2271b and 2272b are formed on the second metal layer 2240b in the wordline bonding area WLBA. In the wordline bonding area WLBA, the lower bonding metals 2271b and 2272b of the peripheral region PREG may be electrically connected to the upper bonding metals 2371b and 2372b of the cell region CREG by, for example, Cu-to-Cu bonding.

Further, in the bitline bonding area BLBA, an upper metal pattern 2392, corresponding to a lower metal pattern 2252, which is connected to a lower metal pattern 2251, formed in the uppermost metal layer of the peripheral region PREG, and having the same cross-sectional shape as the lower metal pattern 2252 of the peripheral region PREG, may be formed in an uppermost metal layer of the cell region CREG. In some embodiments, a contact is not formed on the upper metal pattern 2392 formed in the uppermost metal layer of the cell region CREG.

FIG. 21 is a conceptual diagram illustrating manufacture of a stacked semiconductor device according to example embodiments.

Referring to FIG. 21, respective integrated circuits may be formed on a first wafer WF1 and a second wafer WF2. The memory cell array may be formed in the first wafer WF1 and the peripheral circuits may be formed in the second wafer WF2.

After the various integrated circuits have been respectively formed on the first and second wafers WF1 and WF2, the first wafer WF1 and the second wafer WF2 may be bonded together. The bonded wafers WF1 and WF2 may then be cut (or divided) into separate chips, in which each chip corresponds to a semiconductor device such as, for example, the nonvolatile memory device 2000, including a first semiconductor die SD1 and a second semiconductor die SD2 that are stacked vertically (e.g., the first semiconductor die SD1 is stacked on the second semiconductor die SD2, etc.). Each cut portion of the first wafer WF1 corresponds to the first semiconductor die SD1 and each cut portion of the second wafer WF2 corresponds to the second semiconductor die SD2.

As will be appreciated by one skilled in the art, embodiments of the present disclosure may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

The example embodiments described herein may be applied to any electronic devices and systems including a storage device. For example, one or more aspects of the present disclosure may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

The foregoing is illustrative of example embodiments and is not to be construed as limiting thereof. Although a few example embodiments have been described, those skilled in the art will readily appreciate that many modifications are possible in the example embodiments without materially departing from the scope of the present disclosure.

One or more aspects of the present disclosure may be applied to any devices and systems including a memory device demanding a refresh operation. For example, one or more aspects of the present disclosure may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of example embodiments and is not to be construed as limiting thereof. Although a few example embodiments have been described, those skilled in the art will readily appreciate that many modifications are possible in the example embodiments without materially departing from the scope of the present disclosure.

What is claimed is:

1. A storage device comprising:
an interface circuit configured to detect user data and proof of space (POS) data;
a nonvolatile memory device comprising a memory cell array in which a plurality of nonvolatile memory cells are arranged; and
a processor configured to execute a namespace management module and to generate, set and manage namespaces on the nonvolatile memory device, wherein the namespaces comprise at least a user namespace corresponding to a first logical partition of the nonvolatile memory device and a PoS namespace corresponding to a second logical partition of the nonvolatile memory device, and wherein the user namespace is set based on the user data and the PoS namespace is set based on the POS data,
wherein the storage device is configured to:
select a first encryption for the user data and a second encryption different from the first encryption for the POS data,
perform the first encryption on the user data to generate first encrypted data,
perform PoS processing on the POS data to generate operation data,
perform the second encryption on the operation data to generate second encrypted data,
store the first encrypted data in a first namespace of the nonvolatile memory device, and
store the second encrypted data in a second namespace of the nonvolatile memory device, and
wherein the processor configured to execute the namespace management module is further configured to vary a first size of the first logical partition of the nonvolatile memory device corresponding to the user namespace and a second size of the second logical partition of the nonvolatile memory device corresponding to the POS namespace.

2. The storage device of claim 1, wherein the storage device is configured to:
perform the first encryption using a first encryption algorithm, and
perform the second encryption using a second encryption algorithm, wherein the first encryption algorithm is different from the second encryption algorithm.

3. The storage device of claim 1, wherein the namespace management module is configured to determine the first size based on an amount of the user data stored in the nonvolatile memory device and determine the second size based on an entire storage space size of the nonvolatile memory device subtracted by the first size.

4. The storage device of claim 1, wherein the memory cell array of the nonvolatile memory device comprises a plurality of memory blocks, and the namespace management module is configured to set the user namespace and the POS namespace by units of a memory block.

5. The storage device of claim 1, wherein the storage device is configured to differentiate the POS data from the user data based on a namespace identifier included in a command received from an external device.

6. The storage device of claim 5, wherein the interface circuit is configured to transfer data received from the external device to the storage device as the user data when the namespace identifier in the command corresponds to the user namespace.

7. The storage device of claim 5, wherein the interface circuit is configured to transfer data received from the external device to the storage device as the POS data when the namespace identifier in the command corresponds to the POS namespace.

8. The storage device of claim 1, wherein the storage device is configured to:
perform a first decryption of the first encrypted data read from the nonvolatile memory device to generate first decrypted data corresponding to the user data, and
perform a second decryption of the second encrypted data read from the nonvolatile memory device to generate second decrypted data corresponding to the operation data.

9. The storage device of claim 8, wherein the storage device is configured to transfer the first decrypted data to the interface circuit and transfer the second decrypted data to a PoS module.

10. The storage device of claim 1, wherein the storage device is a smart solid state drive (SSD) comprising a field programmable gate array (FPGA) and an SSD.

11. The storage device of claim 10, wherein the nonvolatile memory device is disposed in the SSD, and a PoS module and a security module are disposed in the FPGA.

12. The storage device of claim 1, wherein the interface circuit comprises a network interface card, and the storage device is directly connected, through the network interface card, to a communication network forming a blockchain network.

13. The storage device of claim 1, wherein the storage device is directly connected, through the interface circuit, to a system including a host device, and the host device comprises a network interface card connectable to a communication network forming a blockchain network.

14. A storage device provided as a node among a plurality of nodes connected to a blockchain network, the storage device comprising:
an interface circuit configured to detect user data and proof of space (POS) data;
a nonvolatile memory device comprising a memory cell array in which a plurality of nonvolatile memory cells are arranged; and
a processor configured to execute a namespace management module and to generate, set and manage namespaces on the nonvolatile memory device, wherein the namespaces comprise at least a user namespace corresponding to a first logical partition of the nonvolatile memory device and a PoS namespace corresponding to a second logical partition of the nonvolatile memory device, and wherein the user namespace is set based on the user data and the POS namespace is set based on the POS data,
wherein the storage device is configured to:
select a first encryption for the user data and a second encryption different from the first encryption for the POS data,
perform PoS processing on the POS data to generate operation data;
perform the first encryption of the user data to generate first encrypted data;
perform the second encryption on the operation data to generate second encrypted data;
store the first encrypted data in a first namespace of the nonvolatile memory device; and
store the second encrypted data in a second namespace of the nonvolatile memory device, and
wherein the processor configured to execute the namespace management module is further configured to vary a first size of the first logical partition of the nonvolatile memory device corresponding to the user namespace and a second size of the second logical partition of the nonvolatile memory device corresponding to the POS namespace.

15. A system comprising:
a storage device; and
a host device configured to control the storage device,
wherein the storage device comprises:
an interface circuit configured to detect user data and proof of space (POS) data;
a nonvolatile memory device comprising a memory cell array in which a plurality of nonvolatile memory cells are arranged;
wherein the storage device is configured to execute a namespace management module stored in a non-transitory computer-readable medium and to generate, set and manage namespaces on the nonvolatile memory device, wherein the namespaces comprise at least a user namespace corresponding to a first logical partition of the nonvolatile memory device and a PoS namespace corresponding to a second logical partition of the nonvolatile memory device, and wherein the user namespace is set based on the user data and the POS namespace is set based on the POS data,
wherein the storage device is further configured to:
select a first encryption for the user data and a second encryption different from the first encryption for the POS data,
perform the first encryption on the user data to generate first encrypted data,
perform PoS processing on the PoS data to generate operation data,
perform the second encryption on the operation data to generate second encrypted data,
store the first encrypted data in a first namespace of the nonvolatile memory device, and
store the second encrypted data in a second namespace of the nonvolatile memory device, and
wherein the storage device configured to execute the namespace management module is further configured to vary a first size of the first logical partition of the nonvolatile memory device corresponding to the user namespace and a second size of the second logical partition of the nonvolatile memory device corresponding to the POS namespace.

16. The system of claim 15, wherein the system is a node among a plurality of nodes connected to a proof of space based blockchain network.

* * * * *